US008295226B2

United States Patent
Fujii et al.

(10) Patent No.: US 8,295,226 B2
(45) Date of Patent: Oct. 23, 2012

(54) RADIO COMMUNICATION APPARATUS AND METHOD

(75) Inventors: Hiromasa Fujii, Yokosuka (JP); Hitoshi Yoshino, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 234 days.

(21) Appl. No.: 12/918,853

(22) PCT Filed: Feb. 20, 2009

(86) PCT No.: PCT/JP2009/053050
§ 371 (c)(1),
(2), (4) Date: Oct. 13, 2010

(87) PCT Pub. No.: WO2009/110332
PCT Pub. Date: Sep. 11, 2009

(65) Prior Publication Data
US 2011/0019634 A1    Jan. 27, 2011

(30) Foreign Application Priority Data

Mar. 6, 2008   (JP) ................................. 2008-057026

(51) Int. Cl.
H04B 7/204 (2006.01)
H04J 3/10 (2006.01)
H04J 1/12 (2006.01)
H04W 4/00 (2009.01)
H04W 72/00 (2009.01)

(52) U.S. Cl. ........ 370/319; 370/326; 370/330; 370/343; 370/345; 455/450

(58) Field of Classification Search .......... 370/203–204, 370/208, 277–280, 310–350, 431–443, 535–545; 455/422.1–465, 553.1, 179.1–180.1, 187.1–188.1
See application file for complete search history.

(56) References Cited

U.S. PATENT DOCUMENTS

| | | | | |
|---|---|---|---|---|
| 5,689,502 A * | 11/1997 | Scott | .............................. | 370/281 |
| 2001/0006509 A1* | 7/2001 | Nguyen et al. | ................ | 370/281 |
| 2003/0190892 A1* | 10/2003 | Shimada et al. | .............. | 455/63.1 |
| 2007/0140166 A1* | 6/2007 | Eichinger et al. | ............. | 370/329 |
| 2008/0279125 A1* | 11/2008 | Hottinen | ....................... | 370/281 |
| 2010/0074151 A1* | 3/2010 | Westerberg et al. | .......... | 370/280 |

(Continued)

FOREIGN PATENT DOCUMENTS

JP   2005-244505 A   9/2005

OTHER PUBLICATIONS

Patent Abstracts of Japan, Publication No. 2005-244505, dated Sep. 8, 2005, 1 page.

(Continued)

*Primary Examiner* — Tri H Phan
(74) *Attorney, Agent, or Firm* — Osha Liang LLP

(57) ABSTRACT

A disclosed radio communication apparatus includes an intermediate band detecting unit detecting an intermediate band which is a band between a first frequency band and a second frequency band which are allocated to a same mobile communication system or different mobile communication systems, a use status detecting unit detecting an uplink/downlink multiplexing method used in each of the first frequency band and the second frequency band, and a determination unit determining, based on the intermediate band and the uplink/downlink multiplexing method, the uplink/downlink multiplexing method usable in the intermediate band and a guard band in which use of frequencies are prevented, the guard band being included in the intermediate band.

10 Claims, 27 Drawing Sheets

U.S. PATENT DOCUMENTS

2011/0044214 A1* 2/2011 Fujii et al. .................... 370/278

OTHER PUBLICATIONS

P. Martigne, et al., "An alternative concept to scanning process for cognitive radio systems: technical and regulatory issues," 16th IST Mobile and Wireless Communications Summit, 2007, IEEE, Jul. 2007, 5 pages.

International Search Report issued in PCT/JP2009/053050, mailed on Apr. 21, 2009, with translation, 7 pages.

Written Opinion issued in PCT/JP2009/053050, mailed on Apr. 21, 2009, 3 pages.

* cited by examiner

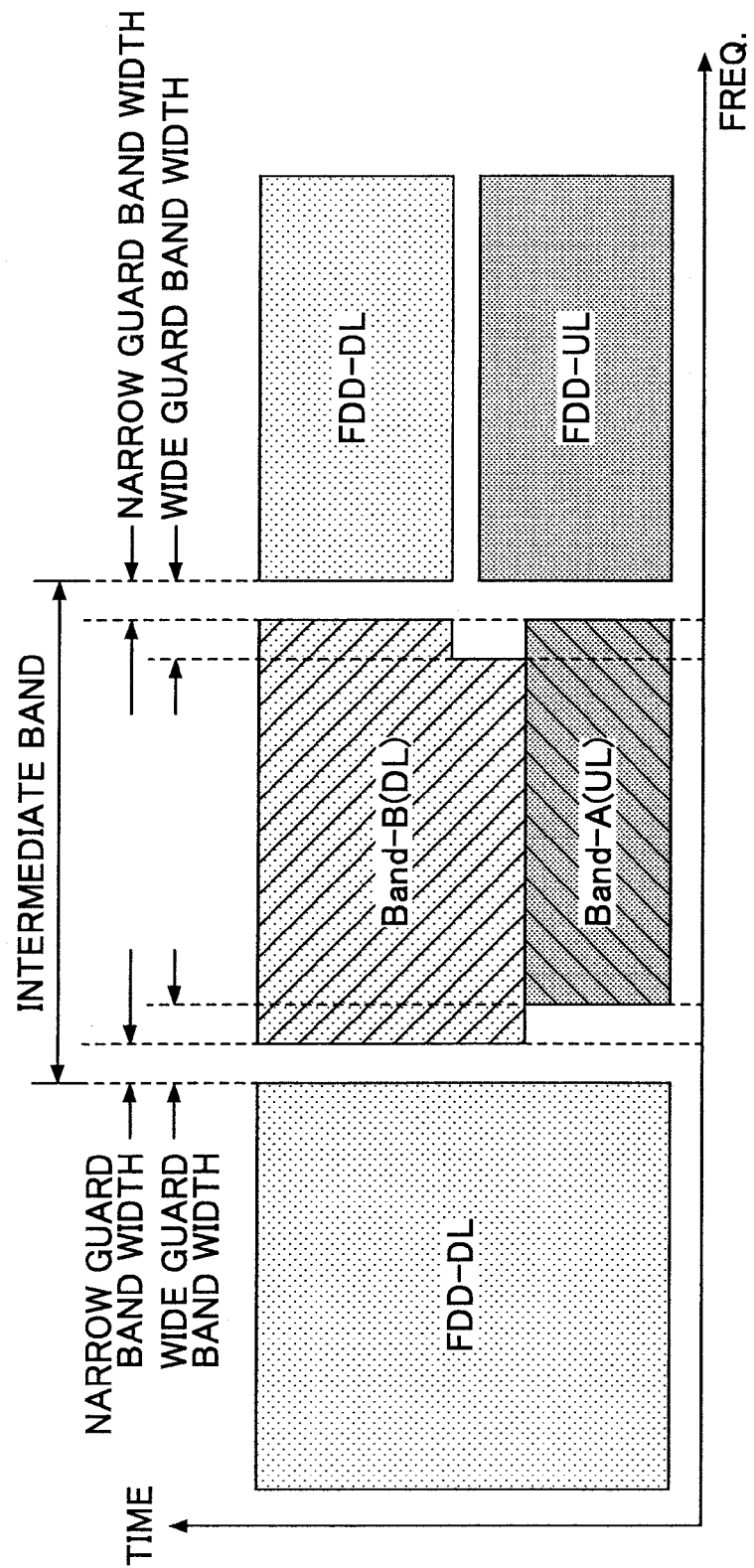

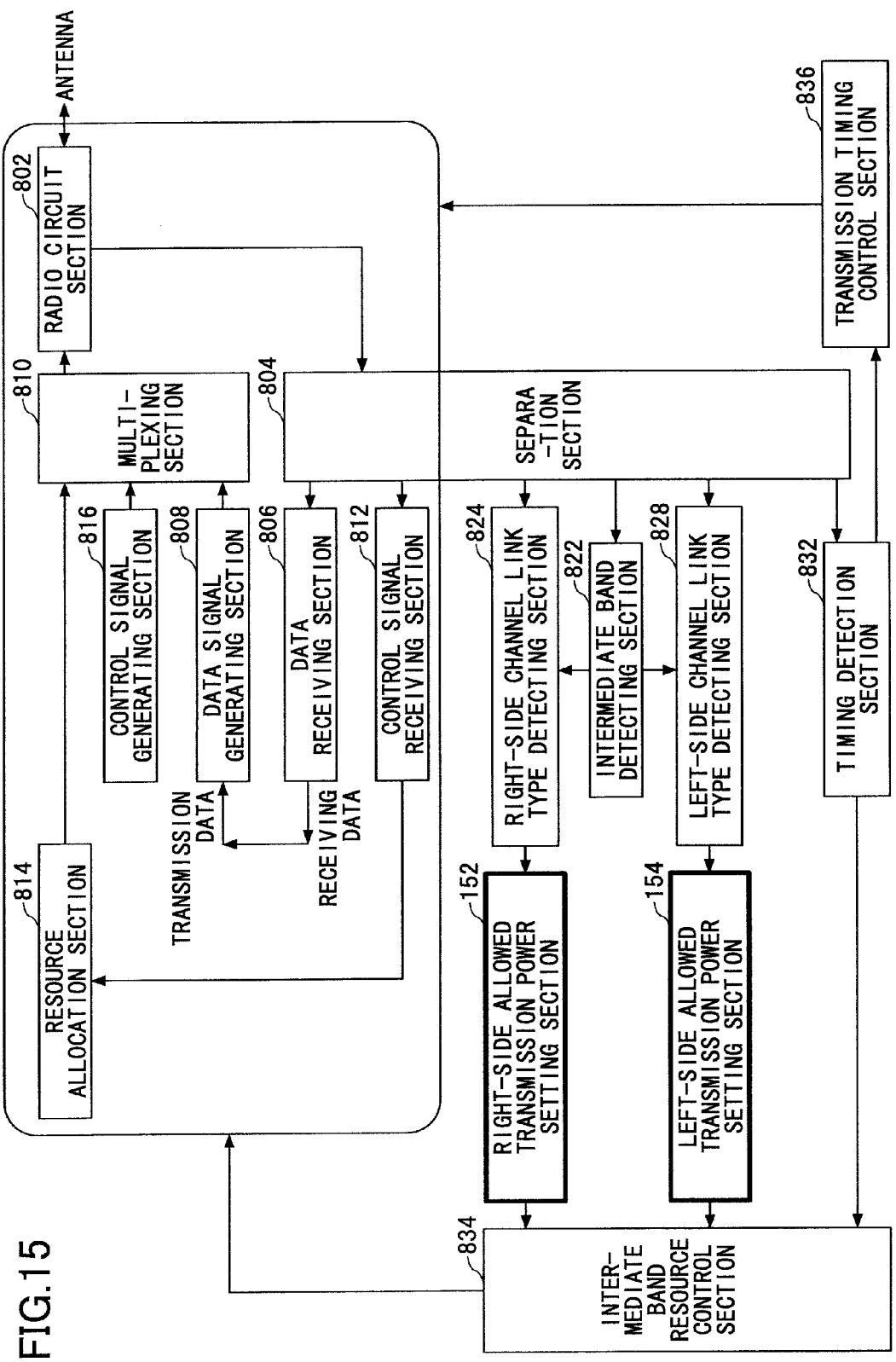

RADIO COMMUNICATION APPARATUS AND METHOD

TECHNICAL FIELD

The present invention generally relates to a technical field of mobile communication, and more particularly to a radio communication apparatus and a method in a mobile communication system.

BACKGROUND ART

In the technical field of the mobile communication, research and development have been actively carried out for a next mobile communication system after the conventional third-generation mobile communication system. The frequency band to be allocated to a future mobile communication system such as the forth-generation mobile communication system is expected to become wider due to the current demand for fast data transmission. In some cases, the allocated band may become so wide that the bands of the existing system are included in a part of the newly allocated frequency bands. In this case, the current system may be changed to the new system through a stage where the current and new systems exist together.

FIG. 1 illustrates examples how bands are allocated. In the "initial" stage, the bands of the current system are allocated on the left side (lower-frequency side). In this case, this system uses the Frequency Division Duplexing (FDD) scheme, and different frequencies are separately used between uplink and downlink transmissions. In next stage, additional bands are provided on the right side (higher-frequency side) for a new system. In the stage "After additional allocation" in FIG. 1, while the current system is used without changing the bands, the use of the new system is ready to be started. Then, eventually, as shown in the stage "Ideal allocation", the service of the new system can be provided using a wider range of the frequency bands. However, during the progress of the stages of FIG. 1, namely, in the stage "After additional allocation", there are plural guard intervals between an uplink band and a downlink band. This may not be preferable from the viewpoint of effective use of frequencies.

On the other hand, the guard interval or the guard band is provided between different system bands or for preparing for the switching the transmission direction between uplink and downlink. In a mobile radio communication system, not only the FDD scheme but also the Time Division Duplexing (TDD) scheme may be used. As described below, a relatively wider guard band is to be provided "between uplink band and downlink band in FDD", "between band in FDD and band in TDD", and "between bands using TDD" rather than "between uplink bands in FDD" and "between downlink bands in FDD".

FIG. 2 illustrates a case where the frequency bands adjacent to each other (adjacent frequency bands) are used as downlink bands. In this case, each terminal receives a desired wave from the base station having a cell in which the terminal is located. Further the terminal also receives an interference wave from another base station. Generally, as long as a terminal of system X receives the desired wave from the most appropriate base station, the influence of the interference wave from the base station Y of system Y the terminal of system X is relatively small. Similarly, in a case where the frequency bands adjacent to each other (adjacent frequency bands) are used as uplink bands, the base station of one system may not receive significant interference from the base station of another system. Therefore, when the adjacent frequency bands are used as the same uplink bands or the same downlink bands, the guard band to be provided between the adjacent frequency bands can be relatively narrower.

FIG. 3 illustrates a case where one of the adjacent frequency bands is used as downlink band and the other one of the adjacent frequency bands is used as uplink band (i.e., the downlink band and the uplink band are adjacent to each other). In this case, while the terminal of the system X transmits data, the base station of the other system Y also transmits data. As a result, the waves from the base stations interfere with each other. In this case, the base station may typically receive greater interference from the other base station than interference from the terminal. This is because when compared with the interference from the terminal to the base station, the interference between the base stations is greater because the base station has higher receiving sensitivity and higher antenna height and may receive the transmitted interference wave from further location.

FIG. 4 more specifically illustrates a case where one of the adjacent frequency bands is used as downlink band and the other one of the adjacent frequency bands is used as uplink band. As illustrated in FIG. 4, the base station C receives a desired wave (uplink signal) from the terminal C and further receives an interference wave from other base station A. In this case, though it is not intent to limit the corresponding relationship, for example, the base station C, the base station X, and the terminal C in FIG. 4 correspond to the base station X, the base station Y, and the terminal X, respectively, in FIG. 3. As described above, the source of the interference in uplink from other base station is the base station. Therefore, when compared with a case of the interference from the terminal, the transmission power and the antenna gain become greater. Further, the influence of the interference between the bands may become greater due to, for example, the influence of the propagation environment with good view.

Also, FIG. 5 more specifically illustrates a case where one of the adjacent frequency bands is used as downlink band and the other one of the adjacent frequency bands is used as uplink band. However, the directions of the uplink and downlink in FIG. 5 are different from those in FIG. 4. As illustrated in FIG. 5, the terminal A receives a desired wave (downlink signal) from the base station A, and further receives an interference wave from other terminal C. In this case, though it is not intent to limit the corresponding relationship, for example, the terminal A, the base station A, and the terminal C in FIG. 5 correspond to the terminal Y, the base station Y, and the base station X, respectively, in FIG. 3. In this case, the source of the interference in downlink from terminal is the terminal. Therefore, when compared with a case of the interference from the base station, the transmission power and the antenna gain become smaller. However, it should be noted that there is possibility that the terminals approach each other within a short distance. In this case, the interference between the bands may be increased. For example, when the terminals are both located at the edge of the cell, the terminals may approach each other within a short distance.

Therefore, the guard band between an uplink band and a downlink band adjacent to the uplink band is required to be wider than the guard band between the uplink bands adjacent to each other and the guard band between the downlink bands adjacent to each other.

Further, in addition to the above, in the FDD scheme, the base station and terminals may receive data while transmitting data. Because of this feature, it may be required that the frequency band for the data transmission is sufficiently separated from the frequency band for the data reception.

To solve the problem described above, a method is disclosed of using software-defined radio technique and the Cognition supporting Pilot Channel (CPC) as illustrated in FIG. 6 (see Non-Patent Document 1).

Non-Patent Document 1: An alternative concept to scanning process for cognitive radio systems: technical and regulatory issues IEEE

DISCLOSURE OF INVENTION

Problems to be Solved by the Invention

According to the method described in Non-Patent Document 1, for example, the CPC (a pilot channel globally used) is used to broadcast information items. In this case, each terminal periodically monitors the CPC when and after the power is turned ON. The CPC includes, for example, an information item indicating a frequency allocation status (e.g., operator and radio interface specification) of a certain frequency band. Based on the information item, the terminal reconfigures its configuration so that the terminal transmits data using the allocated frequency band.

FIG. 6 schematically illustrates an example of a system using the CPC. In this example, two different systems exist together in the same area, and operators 1 and 2 provide the respective services. Further, the terminals of the systems receive the CPC.

On the other hand, to realize this method, it is required for each terminal to transmit and receive a signal (data) using a frequency specified by the CPC. Namely, all the terminals are required to be designed to transmit and receive signals using any of a plurality of frequency bands. Therefore, when this method is to be applied, a burden imposed on the terminals may be significantly increased. Further, from the viewpoints of equipment investment cost, it may not be easy to realize that the terminals (i.e., the user equipment terminals) have a capability of adequately receiving the CPC in all the possible areas.

On the other hand, various operators provide the respective services in various areas. In this case, if it is assumed that the most adequate communication methods in various areas are uniformly broadcasted using the CPC, the amount of control information to be transmitted using the CPC may be excessively increased. This may not be preferable from the viewpoints of such as the reduction of overhead, the allocation of resources to the data transmission as many as possible so as to improve the throughput performance and the like.

An object of the present invention is to improve the use efficiency of frequencies and prevent excessive increase of overhead caused by control signals when different frequency bands are used in the same area.

Means for Solving the Problems

According to an aspect of the present invention, a radio communication apparatus is used. The radio communication apparatus includes an intermediate band detecting unit detecting an intermediate band which is a band between a first frequency band and a second frequency band which are allocated to a same mobile communication system or different mobile communication systems, a use status detecting unit detecting an uplink/downlink multiplexing method used in each of the first frequency band and the second frequency band, and a determination unit determining, based on the intermediate band and the uplink/downlink multiplexing method, the uplink/downlink multiplexing method usable in the intermediate band and a guard band in which use of frequencies are prevented, the guard band being included in the intermediate band.

Advantageous Effect of the Invention

The present invention may be preferable from the viewpoints of improving the use efficiency of frequencies and preventing the excessive increase of the overhead caused by the control signals when there are plural systems existing in the same area while using different frequencies.

BRIEF DESCRIPTION OF THE DRAWINGS

FIG. 14B is a drawing illustrating an example of using the guard band based on TDD;

FIG. 15 is a drawing illustrating an exemplary configuration (controlling transmission power) of a relay apparatus according to an embodiment of the present invention;

EXPLANATION OF REFERENCES

822: INTERMEDIATE BAND DETECTING SECTION
824, 828: RIGHT-SIDE/LEFT-SIDE CHANNEL LINK TYPE DETECTING SECTIONS
826, 830: RIGHT-SIDE/LEFT-SIDE ADJOINING GUARD BAND WIDTH SETTING SECTION
832: TIMING DETECTING SECTION
834: INTERMEDIATE BAND RESOURCE CONTROL SECTION
836: TRANSMISSION TIMING CONTROL SECTION
152, 154: RIGHT-SIDE/LEFT-SIDE ALLOWED TRANSMISSION POWER SETTING SECTIONS
202, 204: RIGHT-SIDE/LEFT-SIDE ADJOINING CHANNEL LINK TYPE AND RECEIVING LEVEL DETECTING SECTION
231: USE CONTROL SIGNAL RECEIVING SECTION
UE: USER EQUIPMENT TERMINAL
BS: BASE STATION
R: RELAY STATION

BEST MODE FOR CARRYING OUT THE INVENTION

As described below, based on a predetermined rule, a radio communication apparatus used according to an embodiment of the present invention determines a guard band width of an intermediate band adjacent to a band of a mobile radio communication system and further determines the transmission power in the intermediate band so that the intermediate band can be used for relaying signals and local area communications. Herein, the term "radio communication apparatus" is conceptually used as not only a normal base station of a cellular system but also a microcell base station, a femtocell base station, a relay station, a self-operated radio communication apparatus and the like.

Figure 1:
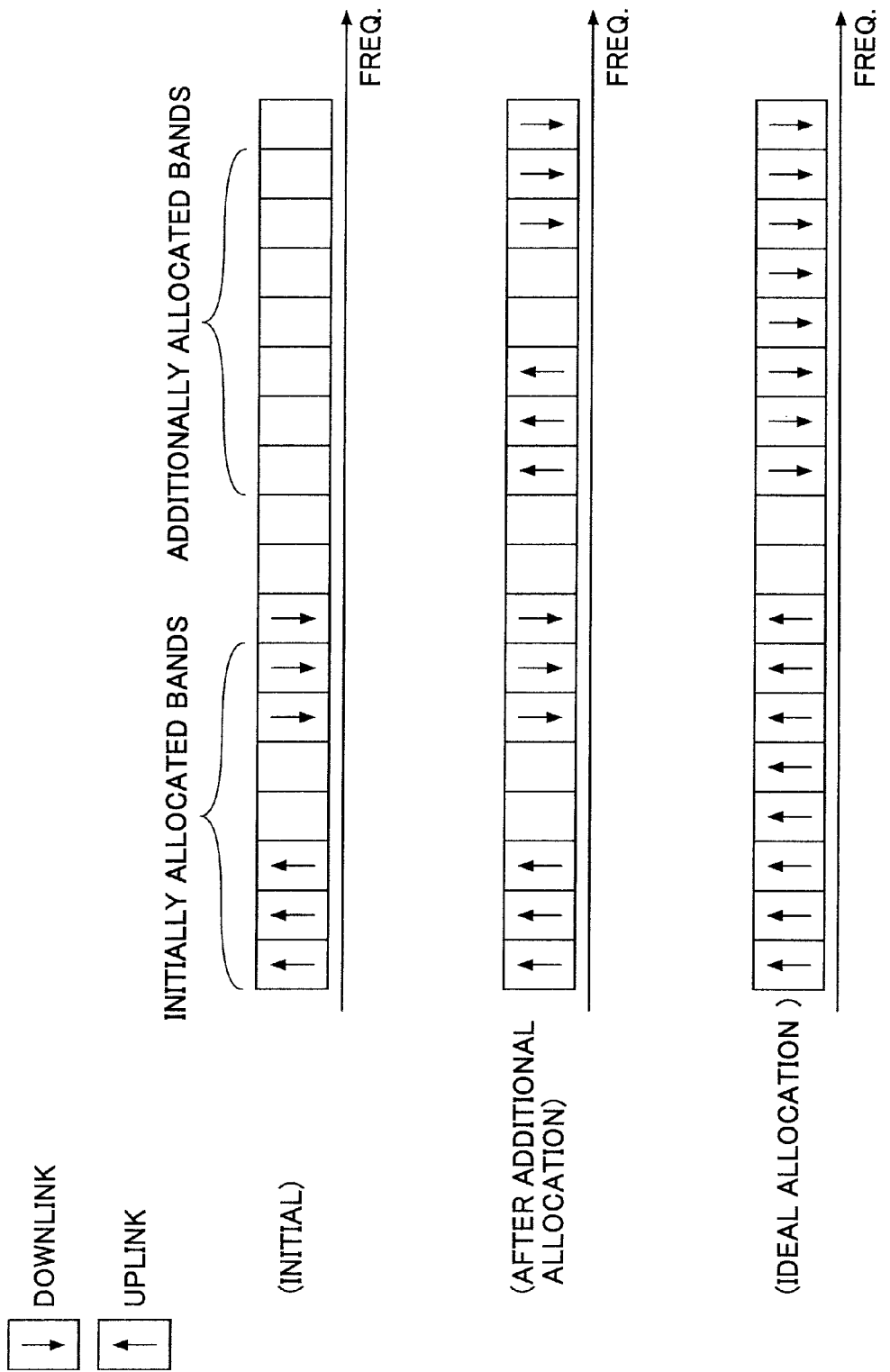
FIG. 1 is a drawing illustrating how the frequency bands are extended.
Figure 2:
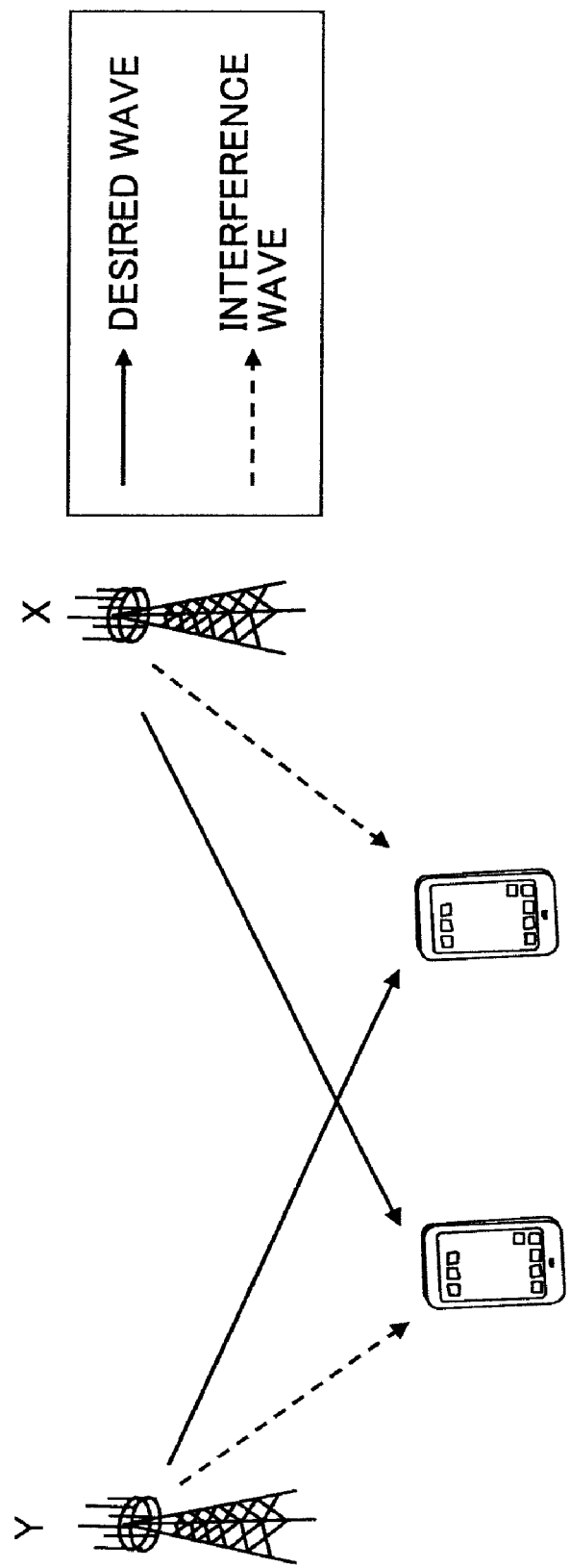
FIG. 2 is a drawing illustrating relationships between a desired wave and an interence wave when the frequency bands adjacent to each other (adjacent frequency bands) are used for the same uplink or downlink transmission.
Figure 3:
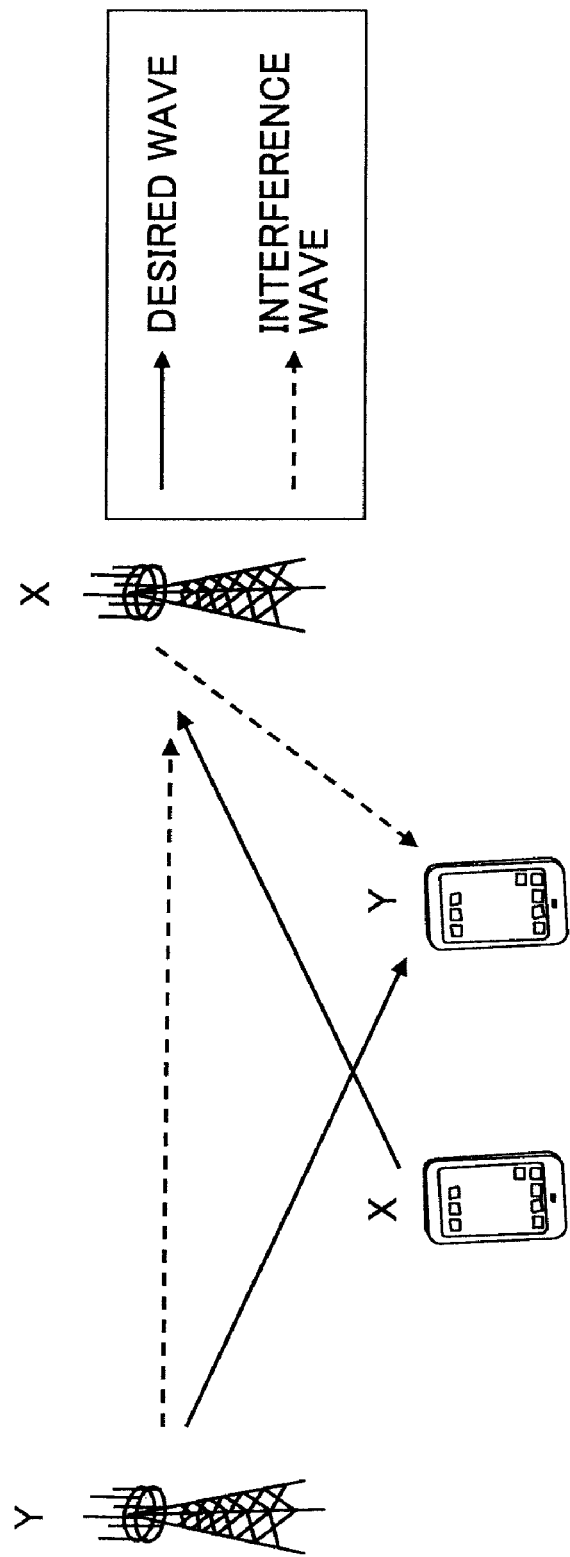
FIG. 3 is a drawing illustrating relationships between a desired wave and an interence wave when the adjacent frequency bands are used for different (uplink and downlink) transmissions.
Figure 4:
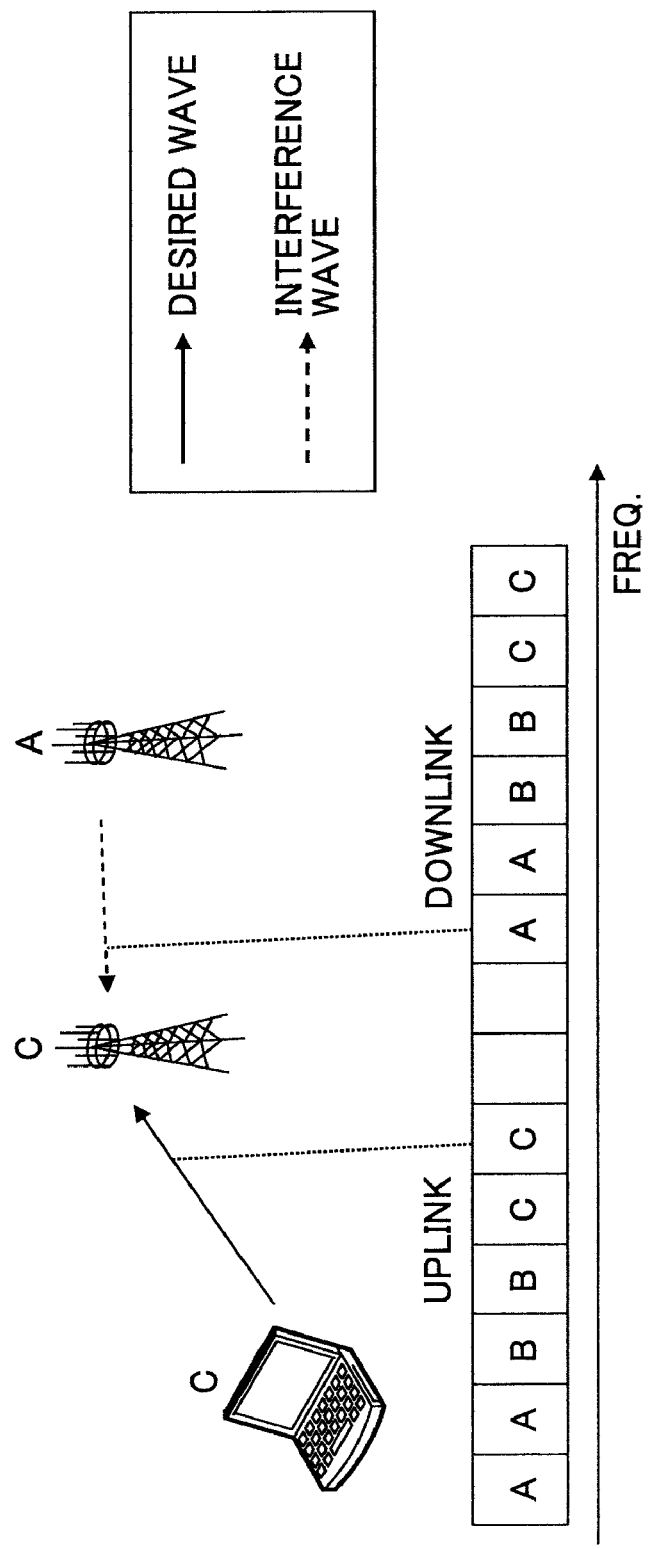
FIG. 4 is drawing illustrating the interference wave generated in uplink when the adjacent frequency bands are used for different (uplink and downlink) transmissions.
Figure 5:
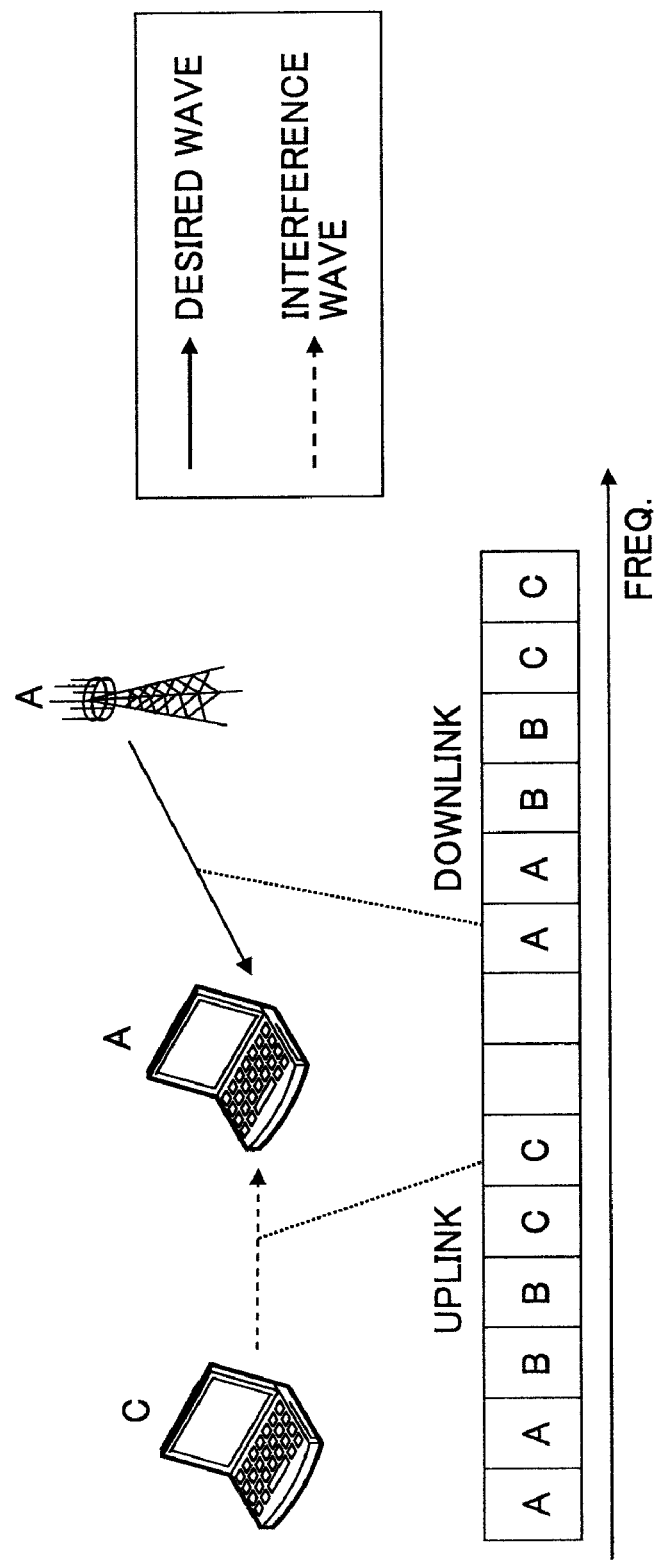
FIG. 5 is drawing illustrating the interference wave generated in downlink when the adjacent frequency bands are used for uplink and downlink.
Figure 6:
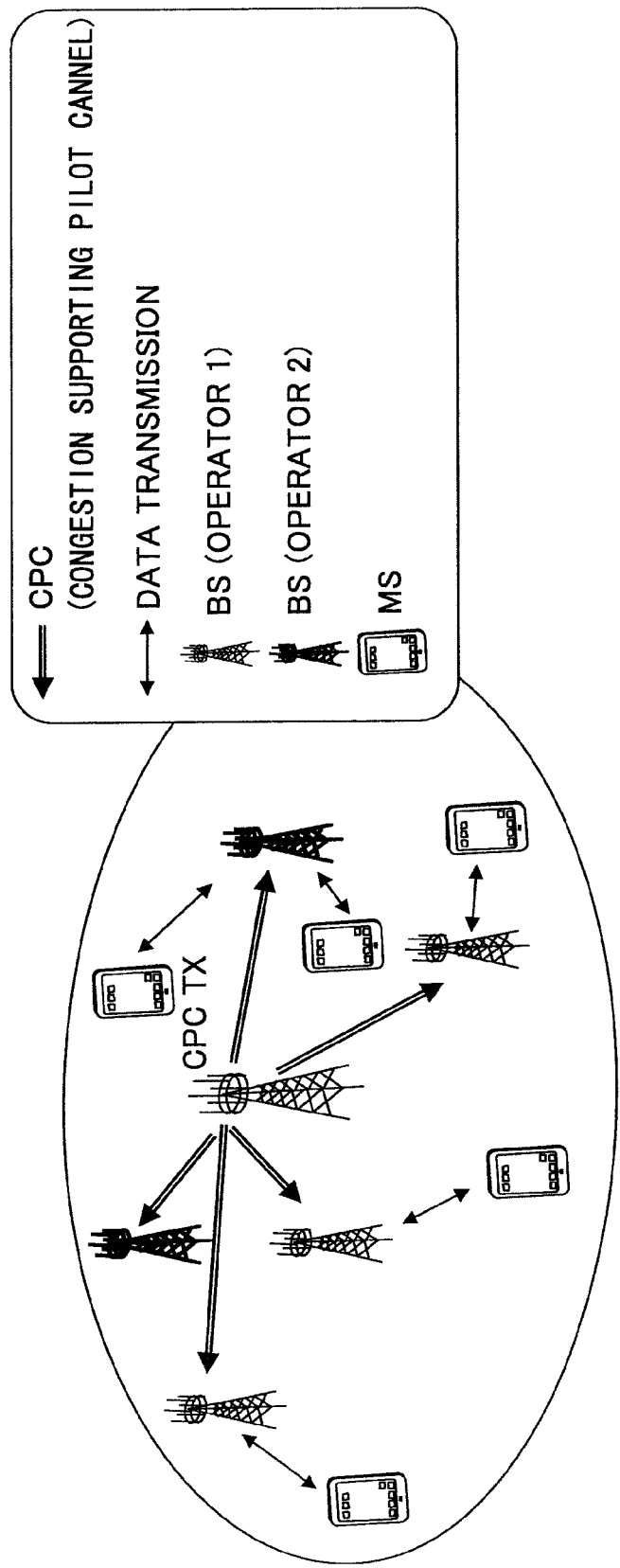
FIG. 6 is a schematic drawing illustrating a system using the CPC.
Figure 7:
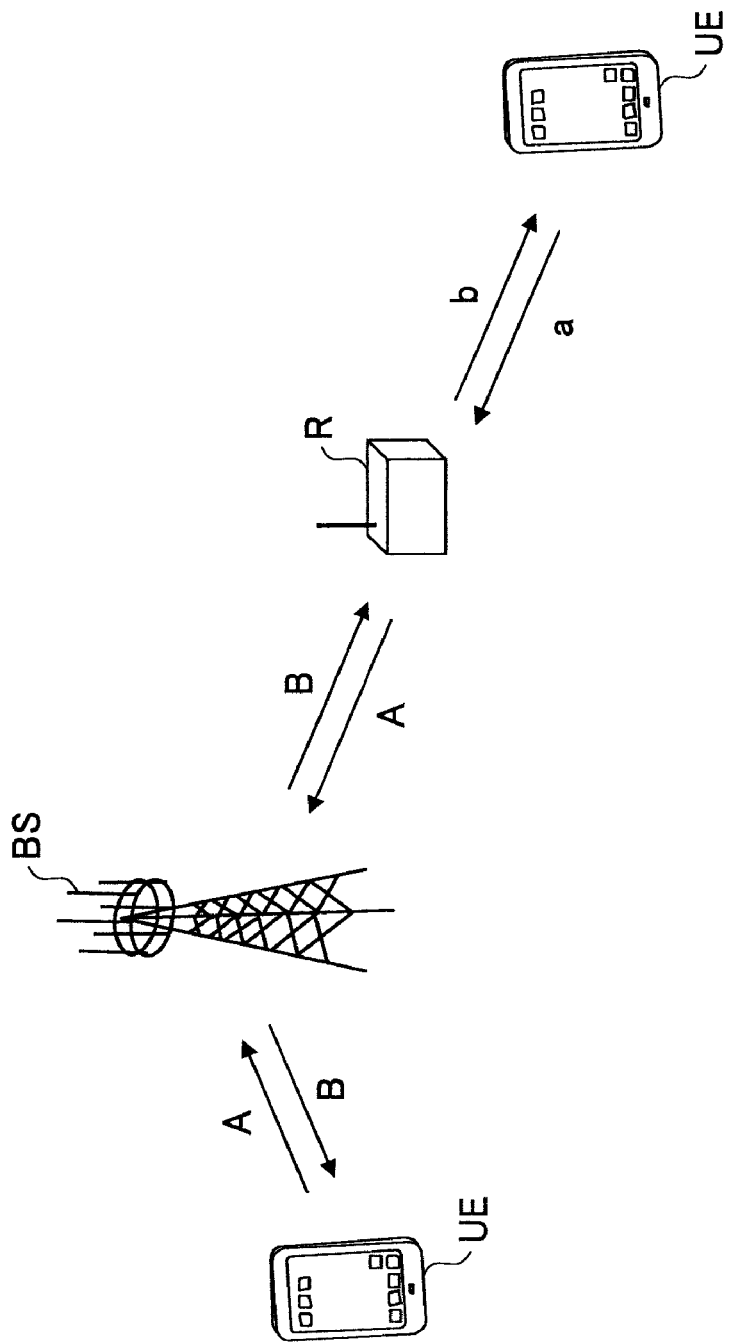
FIG. 7 is a drawing illustrating operations according to an embodiment of the present invention.

FIG. 7 illustrates an example of a system configuration according to an embodiment of the present invention. As illustrated in FIG. 7, normally, the base station (i.e., the radio communication apparatus) BS directly communicates with the mobile station UE. However, when the mobile station UE locates in an area such as in a building or in a shade of building where a wave from the base station may not be directly received, the base station BS may communicate with the mobile station UE via a relay apparatus R. For explanatory purposes, herein, it is a mobile station that communicates with the base station BS. However, more generally, the user equipment UE may communicate with the base station BS and the relay apparatus R.

Normally, the relay apparatus R transmits data using a band provided for its relay operations in a system band. In some cases, the band for relay operations may be the same as that used by the base station for data transmission. However, according to an embodiment of the present invention, the relay apparatus R recognizes the intermediate band other than the system band by performing a method described below. In a conventional system, the intermediate band refers to a guard band between the system bands and has not been used for data transmission. In an embodiment of the present invention, the relay apparatus R determines how the intermediate band is to be used, and performs the relay operations using the intermediate band. For simplification and explanatory purposes, in the following, the present invention may be described using the "relay apparatus". However, more generally, the functions of the "relay apparatus" may be performed in the "radio communication apparatus".

The use of the intermediate band may be limited to short-distance communications between terminals locates at a short distance from each other. By limiting the transmission distance to a short distance, the transmission power may be greatly reduced when compared with normal downlink and uplink transmissions. Because of this feature, it may become possible for the relay apparatus R to use the band that has been used solely for the guard band. Especially, in a case where such band is used for relay the operations, when there are bands "A" and "B" used by the mobile radio communication system and there are bands "a" and "b" used by the relay apparatus, it is preferable that the band "A" and band "a" be sufficiently separated from each other, and the band "B" and band "b" be sufficiently separated from each other.

As described above, theoretically, an information item indicating a method of using the intermediate band (i.e., an allocation method, a limitation of using parameters (of guard band width and allowed transmission power) and the like) may be broadcasted via a common control channel such as the CPC. However, the most appropriate method of using the intermediate band may vary depending on the distance between the relay apparatus and the base station/mobile station in the mobile communication system. Because of this feature, it is not always preferable to use the common control channel to specify (report) all the necessary settings for the method of using the intermediate band.

Further, there may be cases where a method of using desired bands (e.g., uplink/downlink ratio in resources) may vary depending on the traffic content transmitted by the relay apparatus or the self-operated radio communication apparatus. Because of this feature, if it is determined that the CPC is fixedly used to specify the method of using the intermediate band, the degree of freedom may be greatly reduced.

Further, as described above, when it is assumed that all the information items necessary to specify the method of using the intermediate band are to be transmitted solely by the CPC, the amount of control signals necessary for the CPC is increased. As a result, many frequency resources are required to be allocated to the CPC.

Especially, in a case of a multiplexing method using the intermediate band or when there are various link types or effective radiation power values, the amount of the control signals is accordingly increased. This may not be preferable from the viewpoints of reducing the overhead.

In the following, embodiments of the present invention are described from the viewpoints of and in the order of the following features.

1. FDD
2. TDD
3. Transmission power control
4. Interference power
5. use control signal

First Embodiment

FDD

In the following, examples of using the intermediate band based on the FDD scheme are described.

Figure 8:
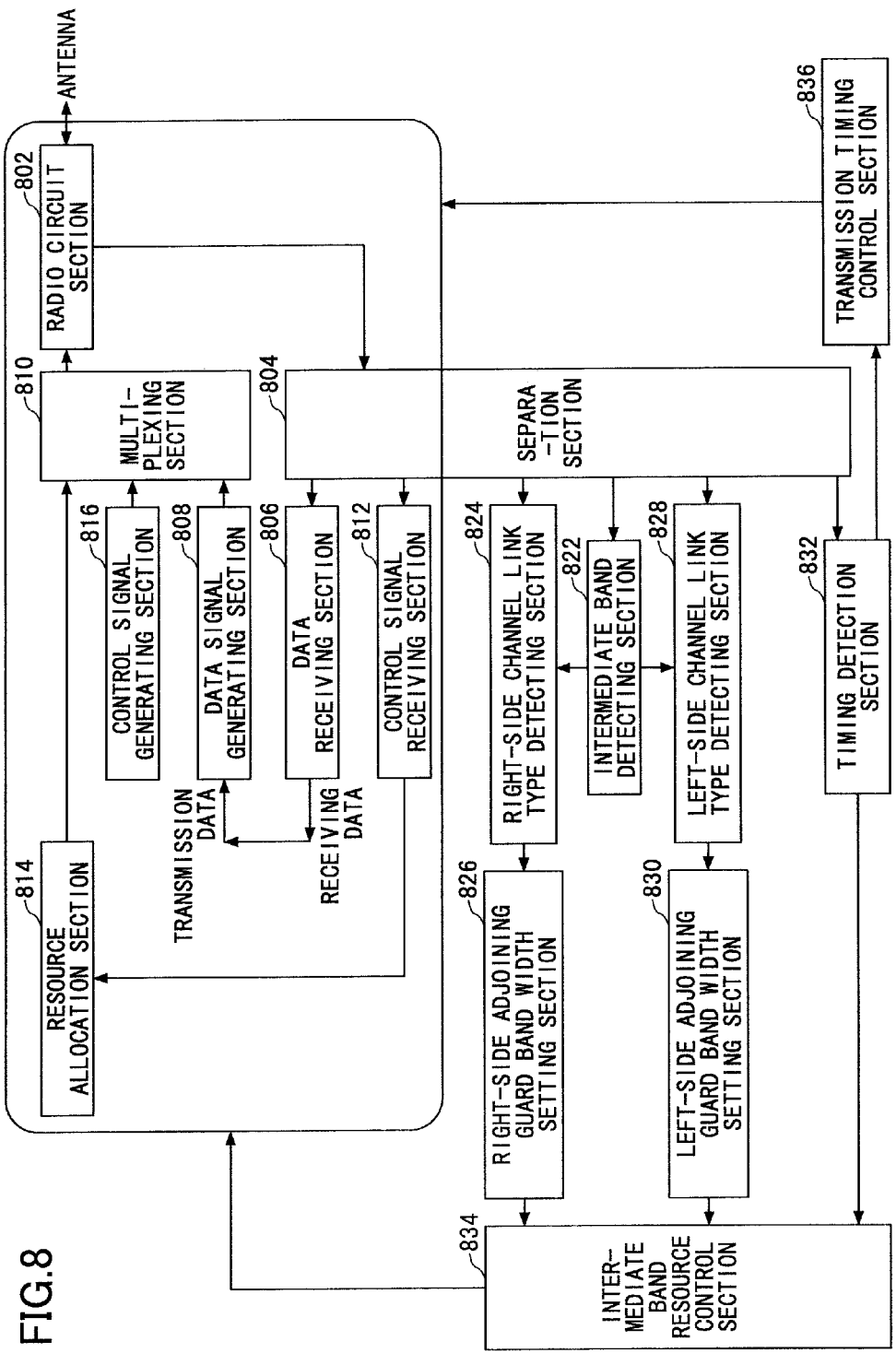
FIG. 8 is a drawing illustrating an exemplary configuration of a relay apparatus according to an embodiment of the present invention.

FIG. 8 shows an exemplary configuration of a relay apparatus according to an embodiment of the present invention. In the configuration of FIG. 8, a radio circuit section 802 receives a signal. The signal includes a signal of the system to which the radio apparatus belongs such as data signal to be relayed and a control signal to be relayed, and an interference signal from another system.

A separation section 804 separates the received signal into various signals included in the received signal, and transmits the various signals to the respective processing sections disposed on the downstream side of the separation section 804.

A data receiving section 806 extracts data signal to be relayed, and transmits the extracted data signal to a data signal generating section 808.

The data signal generating section 808 provides transmission signal based on the received transmission data, information from a resource allocation section 814 and the like, and transmits the transmission signal to a multiplexing section 810.

A control signal receiving section 812 extracts a control signal, and reports necessary information items to the resource allocation section 814. The information items may include an information item indicating whether the channel status is good or not, and a request for allocating resources.

The resource allocation section 814 performs resource allocation for uplink and downlink channels. However, alternatively, the base station which is an upper-level apparatus of the relay apparatus may determine how the resources are allocated (scheduling).

A control signal generating section 816 provides a control signal (including, for example, information item specifying a transmission format of the data signal) to be accompanied with the data signal to be relayed for the relay operation.

A multiplexing section 810 multiplexes received data signal and the control signal base on the resource allocation information. The multiplexing scheme may be any of the time division multiplexing (TDM), the frequency division multiplexing (FDM), the code division multiplexing (CDM) schemes, any combination thereof, or any other appropriate multiplexing scheme.

The relay apparatus according to this embodiment of the present invention further includes an intermediate band detecting section 822, right-side/left-side channel link type detecting sections 824/828, right-side/left-side adjoining guard band width setting sections 826/830, a timing detecting section 832, an intermediate band resource control section 834 and a transmission timing control section 836.

The intermediate band detecting section 822 detects a "guard band between systems" (or "guard band") (i.e. the intermediate band) set between discrete frequency bands allocated to the same mobile communication system or different mobile communication systems. In this case, the intermediate band may be a band between a frequency band allocated to uplink transmission of a mobile communication system and a frequency band allocated to downlink of the same mobile communication system. Further, the intermediate band may be a band between a frequency band allocated to a mobile communication system and a frequency band allocated to another (different) mobile communication system. The number of intermediate band(s) detected in a certain area may be one or more than one.

The intermediate band detecting section 822 detects the intermediate band by using any appropriate method. For example, in one method, a signal power of the frequency range to be monitored may be measured. Then, based on a result of the measurement, the intermediate band is detected. Otherwise, when there is a control information item (common control channel) indicating how the intermediate band is provided (determined), the intermediate band may be specified by analyzing the control information item. For example, by using the common control channel, a system that may be currently used may be specified. Further, it may be determined whether the frequency band of the specified system is actually being used around the relay apparatus. Otherwise, from the viewpoint of the rapid recognition of the use status of the bands, it may be preferable that allocation patterns of the respective systems bands be determined in advance (e.g., the system bands are allocated in a manner such that the width of the system bands is 20 MHz).

The right-side channel link type detecting section 824 detects information items (use status) indicating, for example, which type of multiplexing scheme is being used in uplink and downlink of the system band adjacent to the intermediate band on the higher-frequency side of the intermediate band. The term "right-side" herein refers to the higher-frequency side on the frequency axis. Therefore, it should be noted that the term "right-side" is used for simplification and explanatory purposes only and is not essential to the present invention. The right-side channel link type detecting section 824 determines, for example, whether the FDD scheme is being used in the adjacent system band, whether the TDD scheme is being used in the adjacent system band, whether the band adjacent to the intermediate band is allocated to uplink transmission, and whether the band adjacent to the intermediate band is allocated to downlink transmission. In this case, the right-side channel link type detecting section 824 may determine the multiplexing scheme or a transmission direction (i.e., uplink or downlink) based on a known signal (a preamble or a pilot signal) used in the systems. Otherwise, the blind estimation may be performed based on statistical characteristics of uplink and downlink signals. In this case, the determination is made based on a pattern generated by meaningful signals. For example, the determination is made based on a pattern indicating that signals are transmitted from the same point at least periodically because downlink signals are transmitted from the base stations or based on a pattern indicating that uplinks signals from the user terminals are likely to be transmitted randomly in both the time and frequency domain.

The left-side channel link type detecting section 828 detects information items (use status) indicating, for example, which type of multiplexing scheme is being used in uplink and downlink of the system band adjacent to the intermediate band on the lower-frequency side of the intermediate band. The term "left-side" herein refers to the lower-frequency side on the frequency axis. Therefore, it should be noted that the term "left-side" is used for simplification and explanatory purposes only and is not essential to the present invention. The left-side channel link type detecting section 828 determines, for example, whether the FDD scheme is being used in the adjacent system band, whether the TDD scheme is being used in the adjacent system band, whether the band adjacent to the intermediate band is allocated to uplink transmission, and whether the band adjacent to the intermediate band is allocated to downlink transmission. In this case, the left-side channel link type detecting section 828 may determine the multiplexing scheme or the transmission direction (i.e., uplink or downlink) based on a known signal (the preamble or the pilot signal) used in the systems. Otherwise, the blind estimation may be performed based on statistical characteristics of uplink and downlink signals. In this case, the determination is made based on a pattern generated by meaningful signals. For example, the determination is made based on a pattern indicating that signals area transmitted from the same point at least periodically because downlink signals are transmitted from the base stations or based on a pattern indicating that uplinks signals from the user terminals are likely to be transmitted randomly in both the time and frequency domain.

The right-side adjoining guard band width setting section 826 determines the guard band width to be provided on the higher-frequency side of and within the intermediate band based on the detection result detected by the right-side channel link type detecting section 824. On the other hand, the left-side adjoining guard band width setting section 830 determines the guard band width to be provided on the lower-frequency side of and within the intermediate band based on the detection result detected by the left-side channel link type detecting section 828.

The timing detecting section 832 determines timings to establish the synchronization with a receiving signal. For example, the timing detecting section 832 determines timings for specifying an uplink/downlink ratio of radio frames when the TDD scheme is used. When the TDD scheme is used, the unlink transmission and the downlink transmission performed in respective bands are alternated with each other as time elapses. Further, the signals used to detect the timings by the timing detecting section 832 are a left-side band signal and a right-side band signal.

The intermediate band resource control section 834 determines how the intermediate band is used based on the guard band widths determined by the right-side/left-side adjoining guard band width setting sections 826/830. The intermediate band resource control section 834 further determines the allocation of the resources based on the time ratio. Further, regarding the transmission timing, a signal generated in a guard band to be transmitted during the uplink transmission in the band adjacent to the intermediate band is required to be transmitted when the uplink transmission is performed in the band. To that end, the transmission timing control section 836 is provided.

The transmission timing control section 836 determines the transmission timing based on the determined timing, and reports the determined transmission timing to the radio circuit section 802 and the like. Further, the information items indicating the receive timing, the uplink/downlink ratio and the like are reported to the intermediate band resource control section 834 as well.

Herein, the term "guard band" herein refers to a band which is within the intermediate band and where frequencies may not be used. Conventionally, all the frequencies in the intermediate band cannot be used. However, according to an embodiment of the present invention, in a part of the intermediate band, the use of the frequencies is allowed (authorized). Further, in another part of the intermediate band, the use of frequencies is prevented. In other words, conventionally, all of the intermediate band is regarded as the guard band. However, according to an embodiment of the present invention, only a part of the intermediate band is regarded as the guard band, and in the rest of the intermediate band, the use of the frequencies is allowed (authorized). In the following, how the guard band width (more precisely, minimally required guard band width) is determined (set) is described with reference to examples. When the transmissions in the same direction (uplink or downlink) are performed in the intermediate band and the band adjacent to the intermediate band, the width of the guard band between the intermediate band and the band may be set narrower than that to be set when the transmission direction in the intermediate band is opposite to the transmission direction in the band adjacent to the intermediate band. The guard band width to be set in response to various cases may be determined in advance. In this embodiment, it is assumed that the maximum transmission power level is previously determined.

Figure 9:
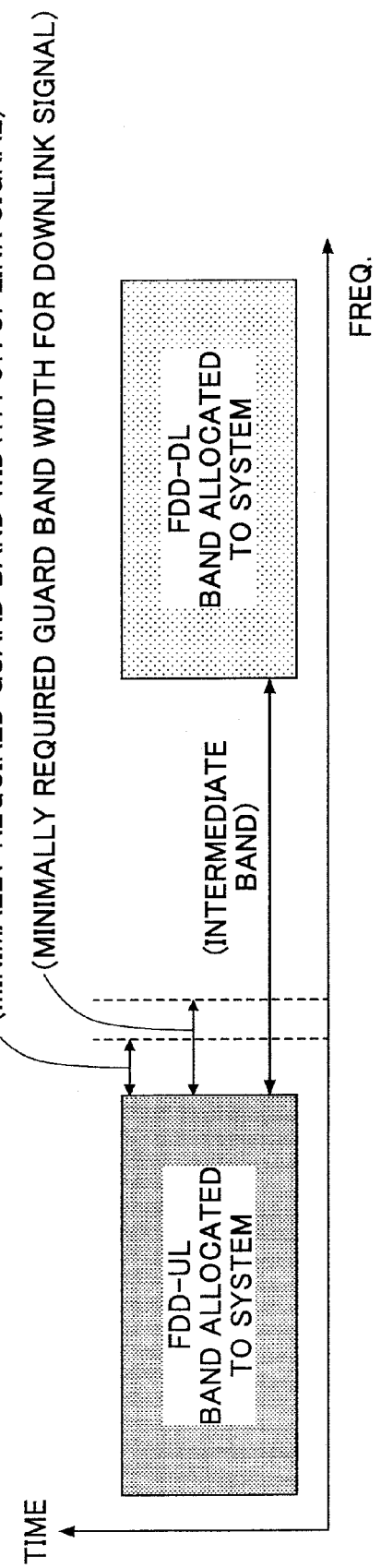
FIG. 9 is a drawing illustrating a guard band width to be set in an intermediate band.

FIG. 9 illustrates how the guard band widths differ depending on uplink and downlink transmission directions in the intermediate band. This example of FIG. 9 schematically illustrates the minimally required guard band width when the frequency on lower-frequency side of the intermediate band is used (illustration on the higher-frequency side is omitted). As illustrated in FIG. 9, the band adjacent to the intermediate band on the lower-frequency side is used for uplink transmission. Therefore, as described above, in at least the lower-frequency side of the intermediate band, the guard band width to be set when uplink transmission is performed may be narrower than the guard band width to be set when downlink transmission is performed. It may not be necessary to mention that, conventionally, the radio resources have not been effectively used because the frequencies (resources) in the intermediate band have not been used.

The intermediate band resource control section 834 may determine a resource allocation method to be used in the intermediate band based on the conditions determined as described above and the uplink and amount of downlink traffic transmitted by the relay apparatus. Details of the examples when the TDD scheme is used are described below.

The terminal to be communicated with the relay apparatus generates a signal, adjusts the transmission timing, and starts communication based on the method of using the radio resources determined by the relay apparatus selected as the communication target of the terminal. This method of using the radio resources determined by the relay apparatus may be recognized (detected) by receiving a control signal when the control signal including an information item indicating which method is selected is broadcasted from the relay apparatus. Further, when such a control signal is not transmitted, the method may be estimated by performing a blind estimation by, for example, receiving the signals transmitted from the relay apparatus and the system.

Figure 10:
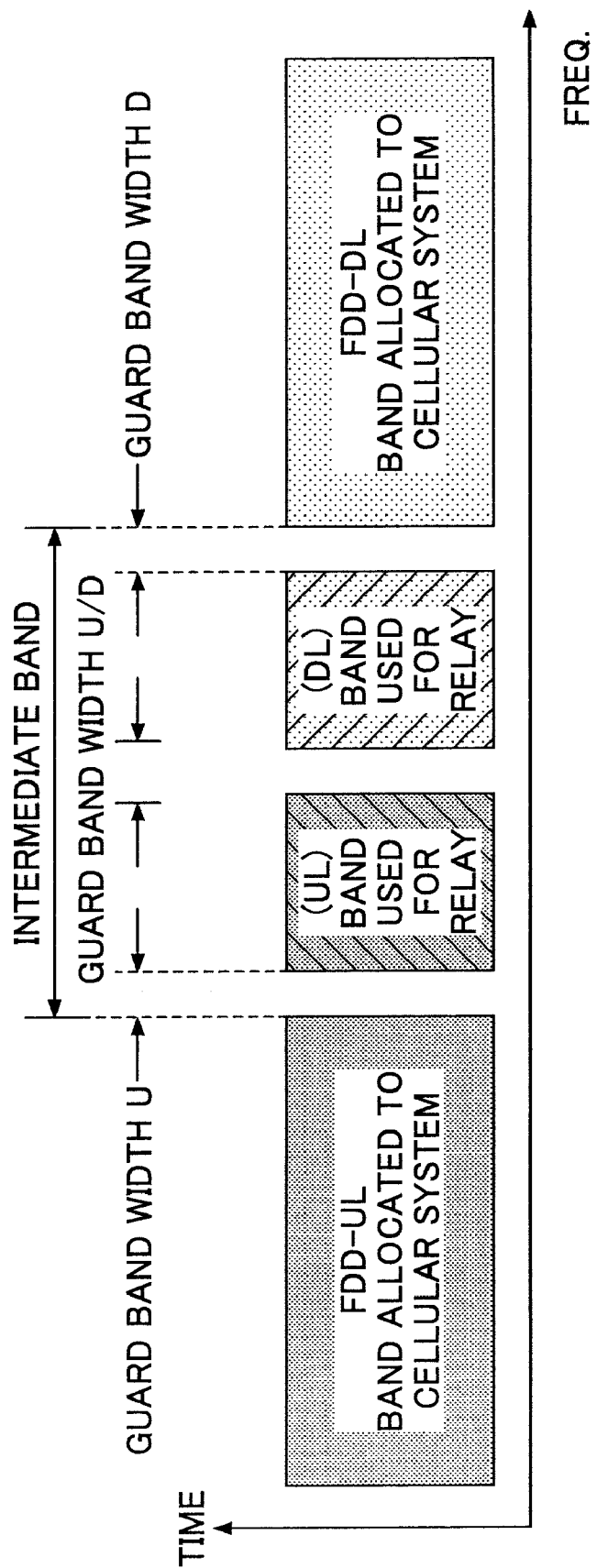
FIG. 10 is a drawing illustrating an example of using the guard band based on FDD.

FIG. 10 illustrates a case where a pair of bands (two bands) is set in the intermediate band. As described above, when the transmissions in the same direction (uplink or downlink) are performed in the bands adjacent to each other, the guard band width between the bands adjacent to each other may be set narrower. However, on the other hand, when the transmission directions are opposite to each other in the respective bands adjacent to each other, the guard band width between the bands adjacent to each other is set to be wider. Because of this feature, in the case of FIG. 10, the guard band width "U" is set narrower than the guard band width "U/D". In the same manner, the guard band width "D" is be set narrower than the guard band width "U/D" (It should be noted that FIG. 10 may not be accurate in the absolute scale).

In this case, the guard band width on the uplink side (UL side) is determined depending on the link type (uplink or downlink) used on the UL side. Similarly, the guard band width on the downlink side (DL side) is determined depending on the link type (uplink or downlink) used on the DL side.

The positions of the pair of bands in the intermediate band are not limited to the positions as illustrated in FIG. 10. For example, the downlink band may be disposed on the lower-frequency side and the uplink band may be on the higher-frequency side (i.e., the positions of the pair of bands are replaced each other). However, from the viewpoint of reducing the guard band width as much as possible, it is preferable that bands having the same transmission direction (i.e., uplink or downlink) be adjacent each other as illustrated in FIG. 10 as long as it is possible. In the example of FIG. 10, there are two frequency bands allocated in the intermediate band. One frequency band closer to the frequency band for FDD uplink transmission is allocated for uplink transmission of the relay apparatus. The other frequency band closer to the frequency band for FDD down link transmission is allocated for downlink transmission of the relay apparatus. Further, the frequency band for downlink transmission of the relay apparatus may also be used for the transmission of the common control channel.

Further, the relay apparatus may determine the amount of resources to be allocated to uplink and downlink transmissions. However, as described above, it should be considered that, for example, regarding the guard band to be allocated closer to the frequency band for uplink transmission, the width of the guard band between the frequency band for uplink transmission and the frequency band for downlink transmission of the relay apparatus be wider than that between the frequency band for uplink transmission and the frequency band for uplink transmission of the relay apparatus. This also applies to a case where the guard band is allocated closer to the frequency band for downlink transmission. Namely, depending on the minimally required guard band widths "U" and "D", the range set as the guard band width "U/D" may be accordingly limited.

When the FDD scheme is used in the intermediated band as described above, in order to prevent the interference between the uplink signal and the downlink signal in the transceiver apparatus, a frequency range for the uplink and downlink signals used in the relay apparatus may be wider. Because of this feature, when there are discrete intermediate bands, the frequency band for uplink transmission of the relay apparatus and the frequency band for downlink transmission of the relay apparatus may be separated into different intermediate bands or may be allocated in the same intermediate band but separated in different time periods.

Figure 11:
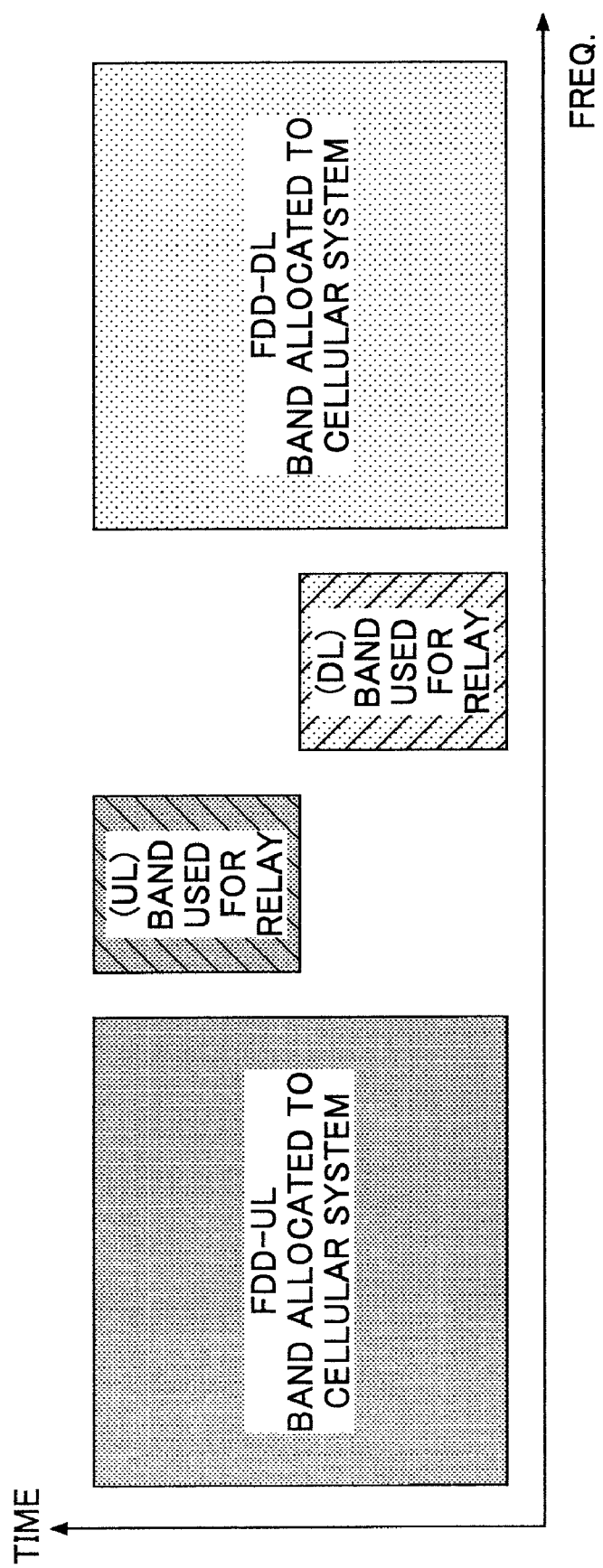
FIG. 11 is a drawing illustrating an example of using the guard band based on FDD and TDD.

FIG. 11 illustrates a case where the pair of bands is allocated using both the FDD and TDD schemes. By allocating the pair of bands in this way, it may become possible to provide a wider guard band between the frequency band for uplink transmission of the cellular system and the frequency band for downlink transmission of the relay apparatus. Similarly, it may become possible to provide a wider guard band between the frequency band for downlink transmission of the cellular system and the frequency band for uplink transmission of the relay apparatus.

Figure 12:
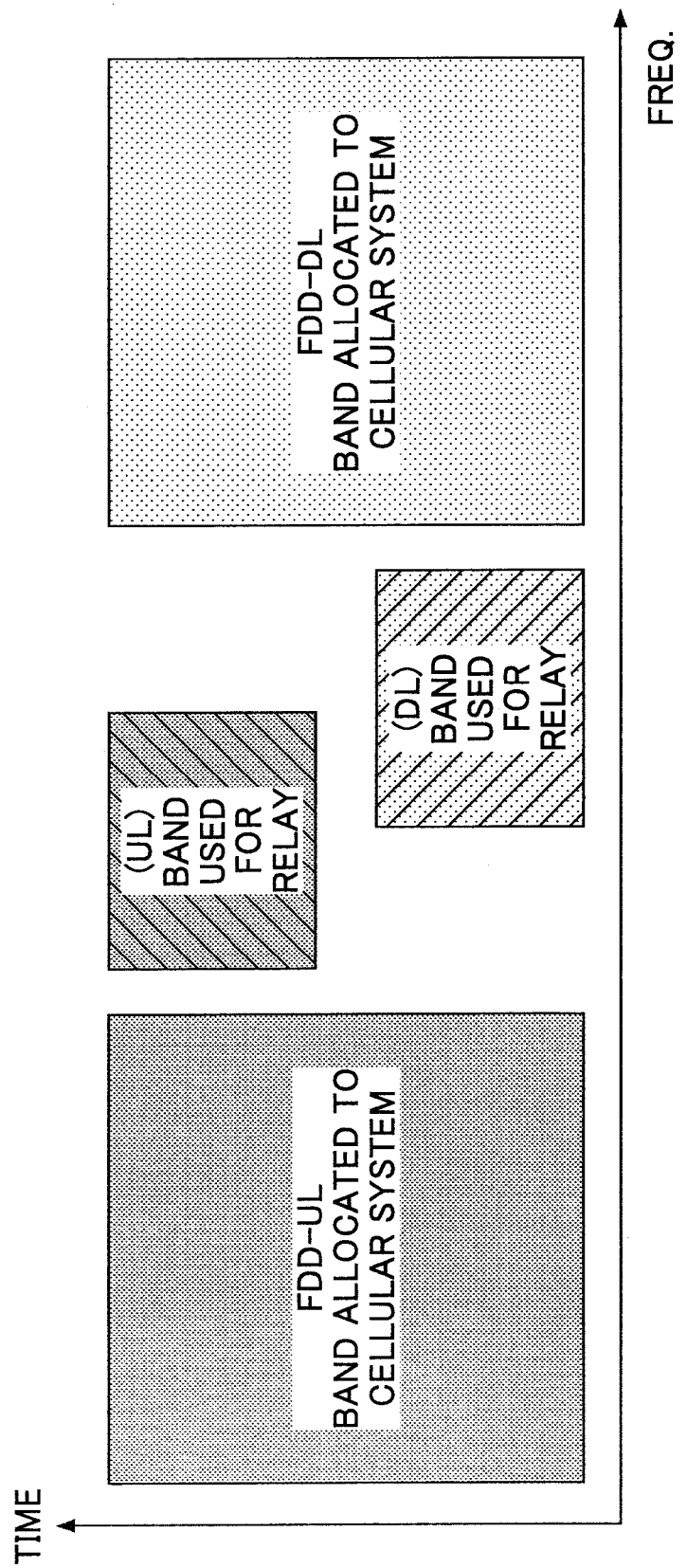
FIG. 12 is a drawing illustrating another example of using the guard band based on FDD and TDD.

FIG. 12 illustrates another case where the pair of bands is allocated using both the FDD and TDD schemes. The pair of bands is allocated in the same manner as illustrate in FIG. 11 except that a part of the frequencies of the pair of bands are overlapped.

Second Embodiment

TDD

In the following, examples of using the intermediate band based on the TDD scheme are described.

Figure 13:
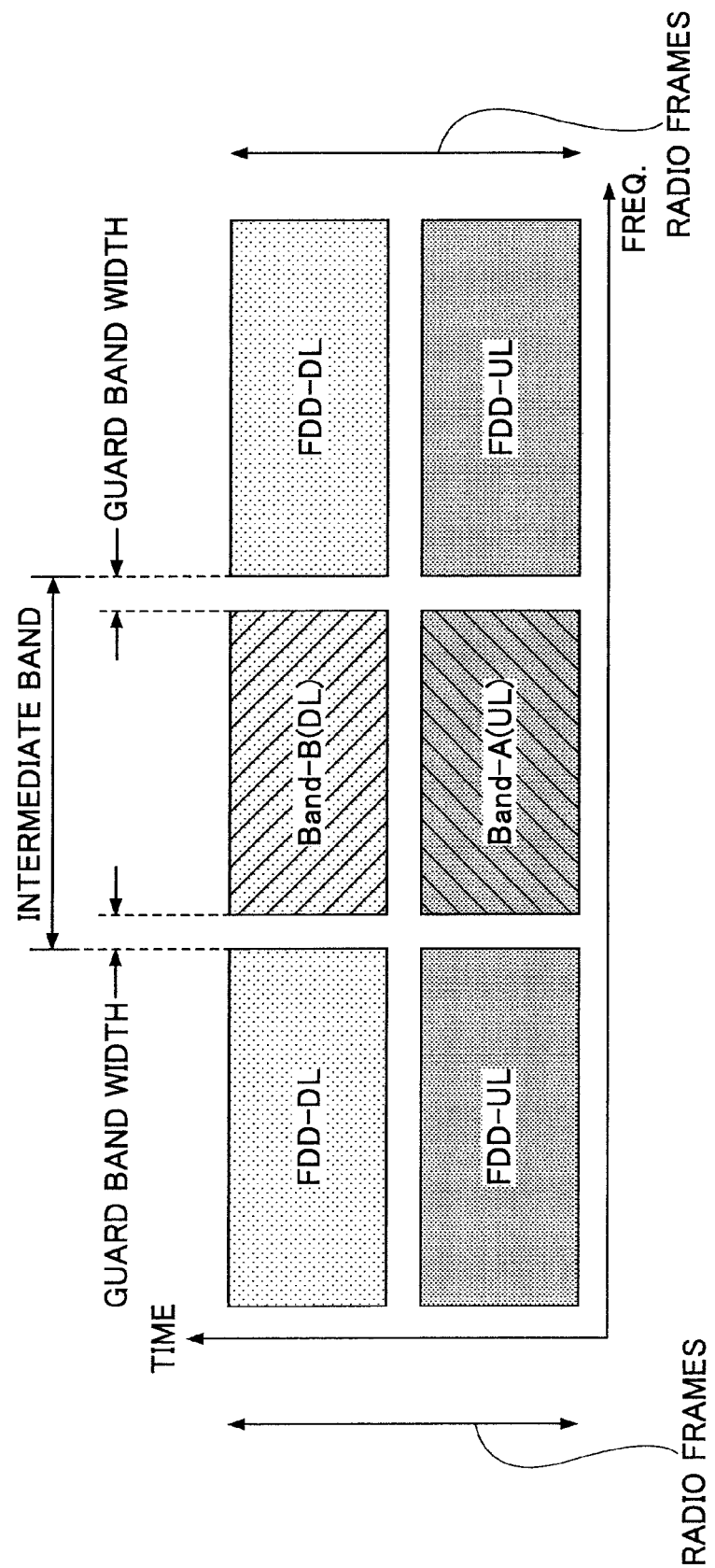
FIG. 13 is a drawing illustrating an example of using the guard band based on sychronized TDD.

FIG. 13 illustrates an example where the intermediate band uses the TDD scheme, the intermediate band being sandwiched between bands of the system using also the TDD scheme. In the following, for explanatory purposes, a system using a band (frequency band) adjacent to the intermediate band may be called "adjacent system". In the example of FIG. 13, it is assumed that the frame length of the radio frames and the uplink/downlink ratio used in the adjacent system are equal to the frame length of the radio frames and the uplink/downlink ratio used in the intermediate band. Further, it is assumed that the relevant radio frames are synchronized with each other. However, the above settings are not always necessary. However, from the viewpoint of narrowing the guard band set in the intermediate band as much as possible, it may be preferable that the same frame length of the radio frames and the uplink/downlink ratio be used and the relevant radio frames be synchronized with each other as illustrated in FIG. 13. This is because, as described above, when the transmissions in the same direction (i.e., uplink or downlink) are performed in the bands adjacent to each other, the width of the guard band between the bands adjacent to each other may be set narrower. However, as described above, the present invention is not limited to this configuration. For example, the uplink/downlink ratio used in the intermediate band may not be equal to the uplink/downlink ratio of the TDD-based system using the band adjacent to the intermediate band. In this case, the uplink/downlink ratio used in the intermediate band may set (changed) depending on the amount of traffic transmitted by the relay apparatus.

Figure 14A:
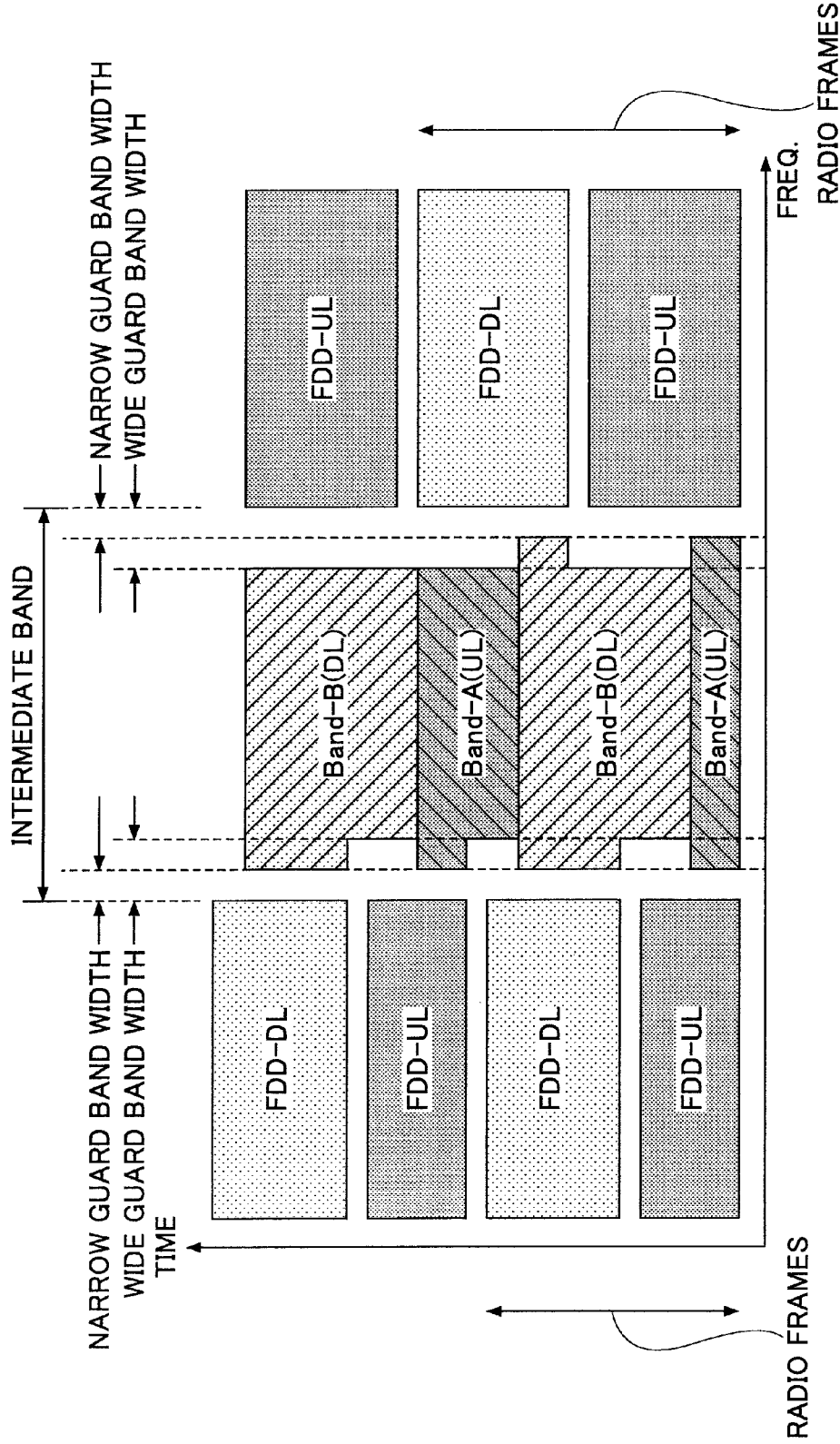
FIG. 14A is a drawing illustrating an example of using the guard band based on asychronized TDD.

FIG. 14A illustrates an example how the intermediate band is used when the TDD-based systems using the respective bands each adjacent to the intermediate band are not synchronized with each other or when the frame length and the uplink/downlink ratio are different. In this case, as described above, the width of the guard band on the right side (higher-frequency side) is determined based on the link type (uplink or downlink) used in the intermediate band and the link type used in the right-side system using the band adjacent to the intermediate band on the right side. Similarly, the width of the guard band on the left side (lower-frequency side) is determined based on the link type (uplink or downlink) used in the intermediate band and the link type used in the left-side system using the band adjacent to the intermediate band on the left side. In the example of FIG. 14A, in a time period when the link type (uplink or downlink) in the intermediate band is the same as that in the band adjacent to the intermediate band, a narrower guard band width may be set to the guard band between the intermediate band and the band adjacent to the intermediate band. On the other hand, in a time period when the link type (uplink or downlink) in the intermediate band is different from that in the band adjacent to the intermediate band, a wider guard band width may be set to the guard band between the intermediate band and the band adjacent to the intermediate band.

As the allowed transmission power of the intermediate bands and the width of the guard band between the band used by the cellular system and the band used by the relay apparatus, the respective predetermined constant values may be used. Further, when the system uses the CPC, the CPC may be used to specify the allowed transmission power value and the guard band width.

FIG. 14B illustrates another example how the intermediate band is used. In this case, as described above, in a time period when the link type in the intermediate band is the same as that in the band adjacent to the intermediate band, a narrower guard band width may be set. On the other hand, in a time period when the link type in the intermediate band is different from that in the band adjacent to the intermediate band, a wider guard band width may be set.

Third Embodiment

Transmission Power Control

The above embodiments describe methods of adaptively controlling the guard band width without changing the (maximum) transmission power. However, the transmission power may be controlled in place of controlling the guard band width or in addition to the control of the guard band width. This is because the strength of interference may depend upon the strength of transmission power.

FIG. 15 illustrates a configuration of a relay apparatus according to an embodiment of the present invention. The configuration of FIG. 15 is basically the same as that of FIG. 8 except that a "right-side allowed transmission power setting section 152" and a "left-side allowed transmission power setting section 154" are provided in place of the "right-side adjoining guard band width setting section 826" and the "left-side adjoining guard band width setting sections 830", respectively. Those right-side/left-side allowed transmission power setting sections 152/154 may be used in place of the right-side/left-side adjoining guard band width setting sections 826/830 as illustrated in FIG. 15, or may be additionally used to the configuration of FIG. 8 and used.

The right-side allowed transmission power setting section 152 determines how the transmission power control should be performed on the higher-frequency side of the intermediate band. As described above, upon assuming that the transmission power is constant, when the bands adjacent to each other have the same transmission direction (i.e., uplink or downlink), the interference between the transmissions is relatively small. On the other hand, when the bands adjacent to each other have the opposite transmission directions to each other (i.e., uplink and downlink), the interference between the transmissions is relatively large. Therefore, when the bands adjacent to each other have the same transmission direction (i.e., uplink or downlink), the transmission power in the intermediate band may not be largely reduced. On the contrary, when the bands adjacent to each other have the opposite transmission directions to each other (i.e., uplink and downlink), the transmission power in the intermediate band may be more largely reduced.

The left-side allowed transmission power setting section 154 determines how the transmission power control should be performed on the lower-frequency side of the intermediate band. Similar to the right-side allowed transmission power setting section 152, when the bands adjacent to each other have the same transmission direction (i.e., uplink or downlink), the transmission power in the intermediate band may not be largely reduced. On the contrary, when the bands adjacent to each other have the opposite transmission directions to each other (i.e., uplink and downlink), the transmission power in the intermediate band may be more largely reduced.

Figure 16:
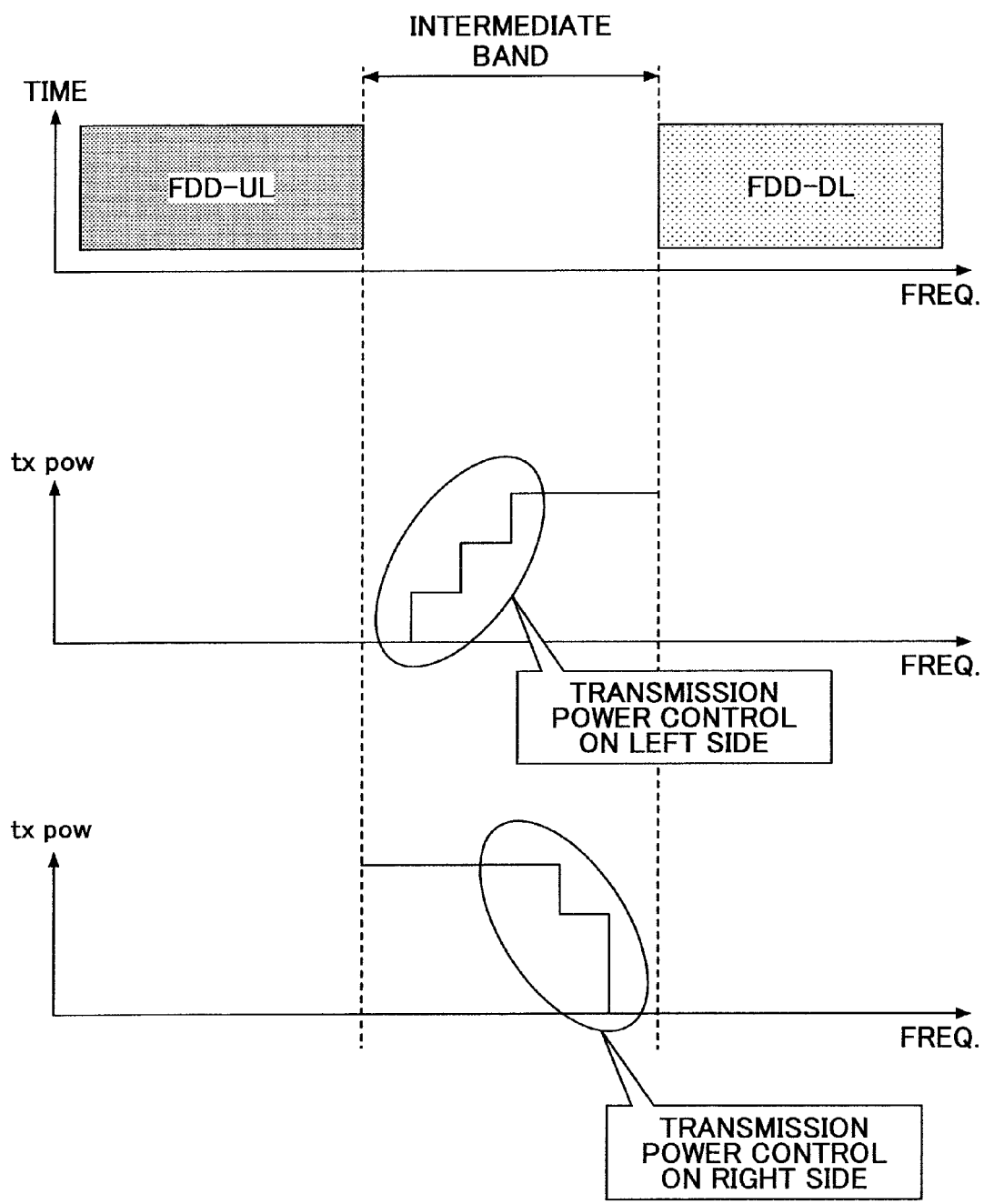
FIG. 16 is a drawing illustrating an example where the transmission power of the intermediate band is controlled.

FIG. 16 illustrates an example how the transmission power changes in the intermediate band. The upper part of FIG. 16 illustrates bands adjacent to the intermediate band. In this example, it is assumed that the FDD scheme is used. The middle part of FIG. 16 illustrates how the transmission power is controlled on the left side of the intermediate band. This control is performed by the left-side allowed transmission power setting section 154. Similarly, the bottom part of FIG. 16 illustrates how the transmission power is controlled on the right side of the intermediate band. This control is performed by the right-side allowed transmission power setting section 152. Namely, the transmission power control may be performed as illustrated in the middle and bottom parts of FIG. 16.

Further, when the effective radiation power (i.e., transmission power+antenna gain) of the relay apparatus in the intermediate band is as low as that of the mobile station, it may not be essential to distinguish the link type (uplink or downlink) in the intermediate band. In this case, the guard band width may be set to a constant value regardless of the link type used in the intermediate band.

Figure 17:
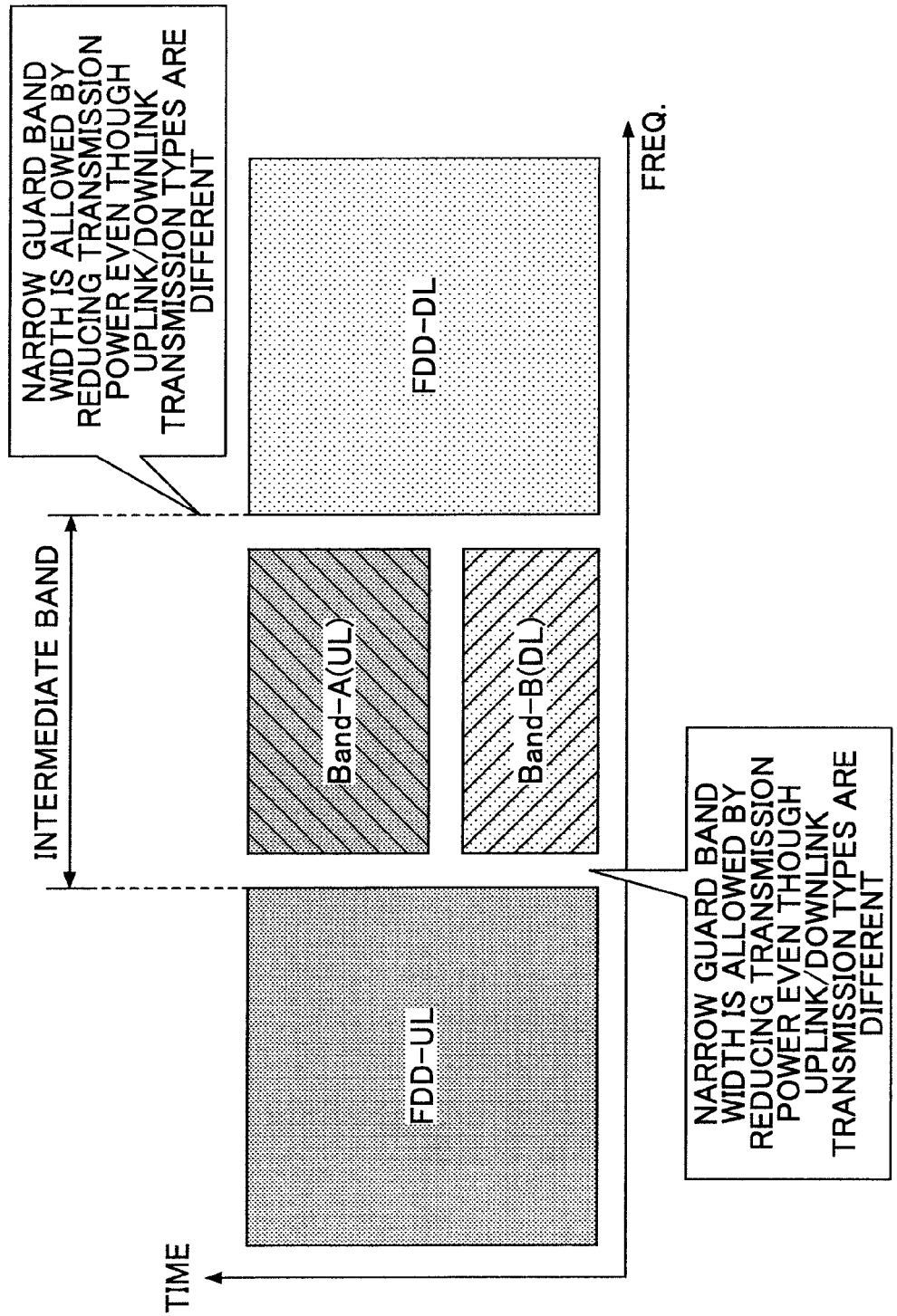
FIG. 17 is a drawing illustrating an example where the intermediate band is used.

FIG. 17 illustrates how the intermediate band is used in the above case. In this case, the width of the guard band between the band used for the mobile radio system and the band used for the intermediate band is determined based on the link type (uplink or downlink) used in the band for the mobile radio system and the band for the relay apparatus. Unlike the cases of FIGS. 14A and 14B, the guard band width may be set narrower by controlling (reducing) the transmission power (as illustrated in FIG. 16) even when the link type in the intermediate band is different from that in the band adjacent to the intermediate band.

Further, when one transmitter largely changes its transmission power, in response to the change of the transmission power, the method of using the intermediate band may be adaptively switched (for example, one of the methods is adaptively selected, the methods including, but not limited to, a method in which the guard band with is changed based on the link type used in the relevant bands and a method in which a constant guard band width is applied regardless of the link type).

Fourth Embodiment

Interference Power

The above embodiments describe methods of adaptively controlling the guard band and the transmission power. Further, a strength of interference may vary depending upon the positional relationship among the relay apparatus, the base station, and the mobile station.

Figure 18:
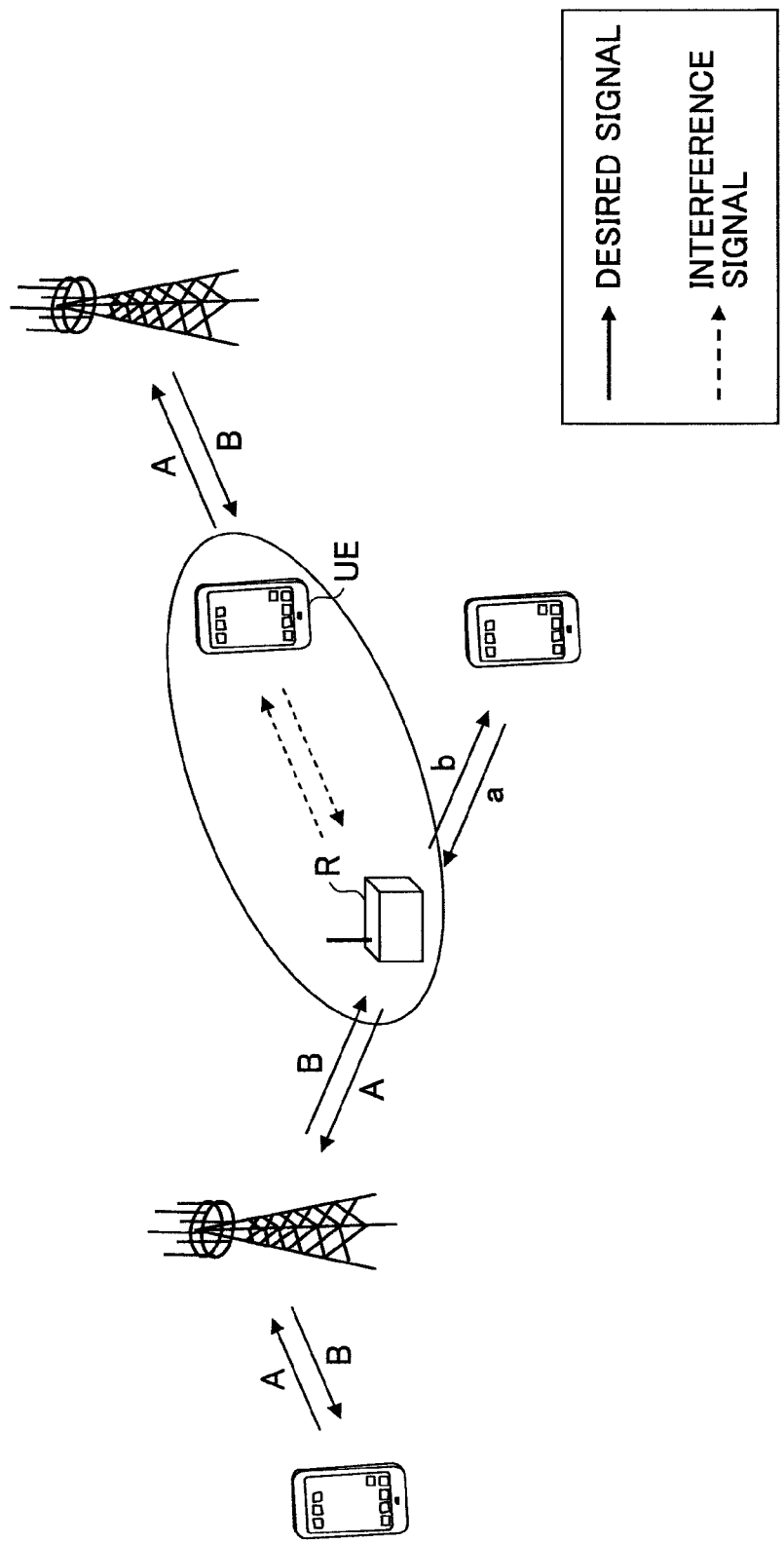
FIG. 18 is a drawing illustrating an example where the interference power is considered (in case of high interference) when the intermediate band is used.

In a state as illustrated in FIG. 18, the mobile station UE and the relay apparatus R of a cellular system are disposed relatively close to each other and used, the mobile station UE using the band adjacent to the intermediate band. In this case, the interference between the bands adjacent to each other is expected to be increased due to the short distance.

Figure 19:
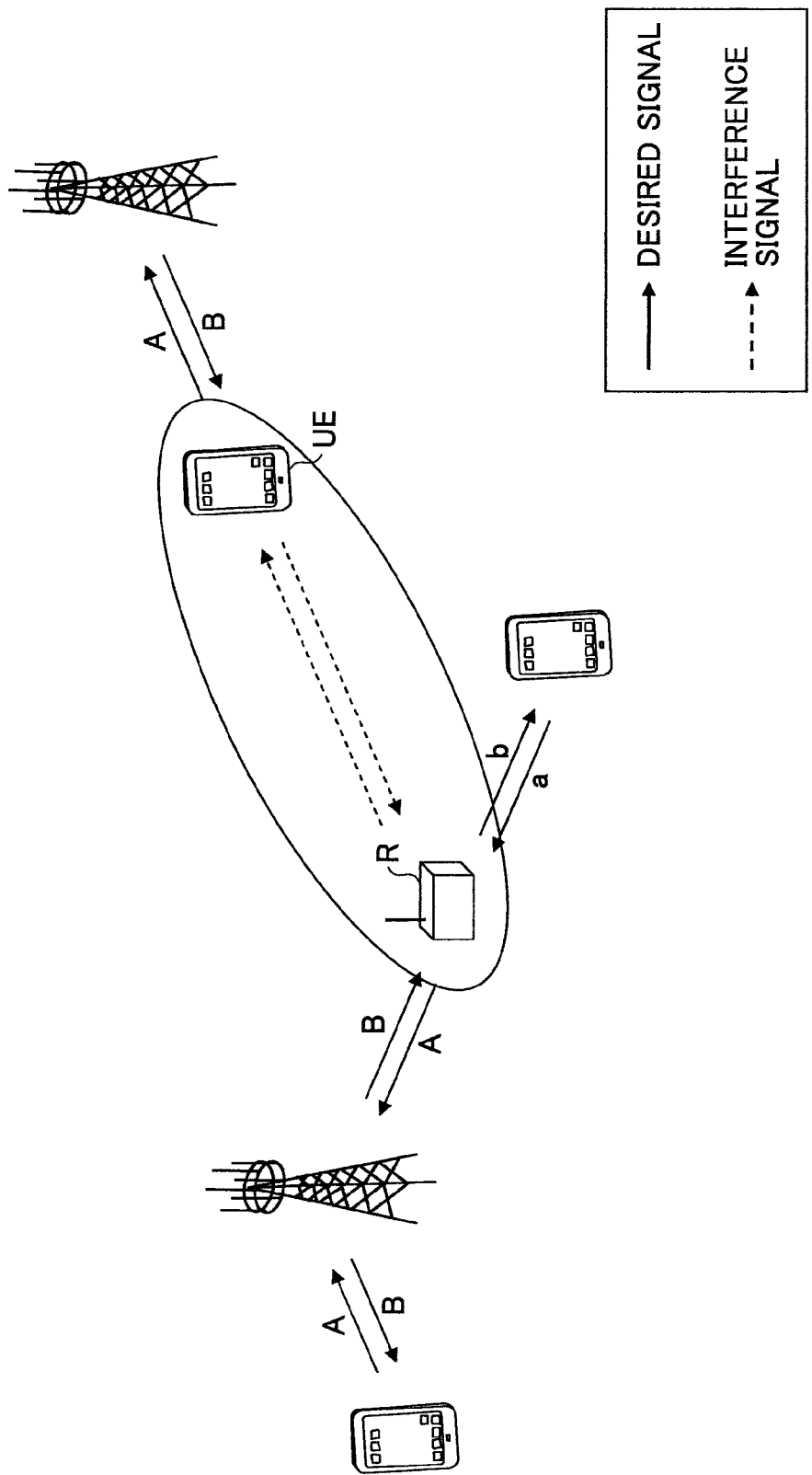
FIG. 19 is a drawing illustrating an example where the interference power is considered (in case of low interference) when the intermediate band is used.

On the other hand, in a state as illustrated in FIG. 19, the distance between the mobile station UE and the relay apparatus R is relatively farther separated from each other. In this case, the interference between the bands adjacent to each other is expected to be reduced due to the long distance.

From the viewpoint of promoting effective use of bands, it may be preferable that the guard band width be set narrower as much as possible. When considering all the aspects described above, there may be a case where the guard band width may be set narrower even when the transmission directions of the bands adjacent to each other are opposite each other. Namely, when the distance between the mobile station UE and the relay apparatus R is relatively short, the guard band width may be set to wider. On the other hand, when the distance between the mobile station UE and the relay apparatus R is relatively long, the guard band width may be set to narrower.

Figure 20:
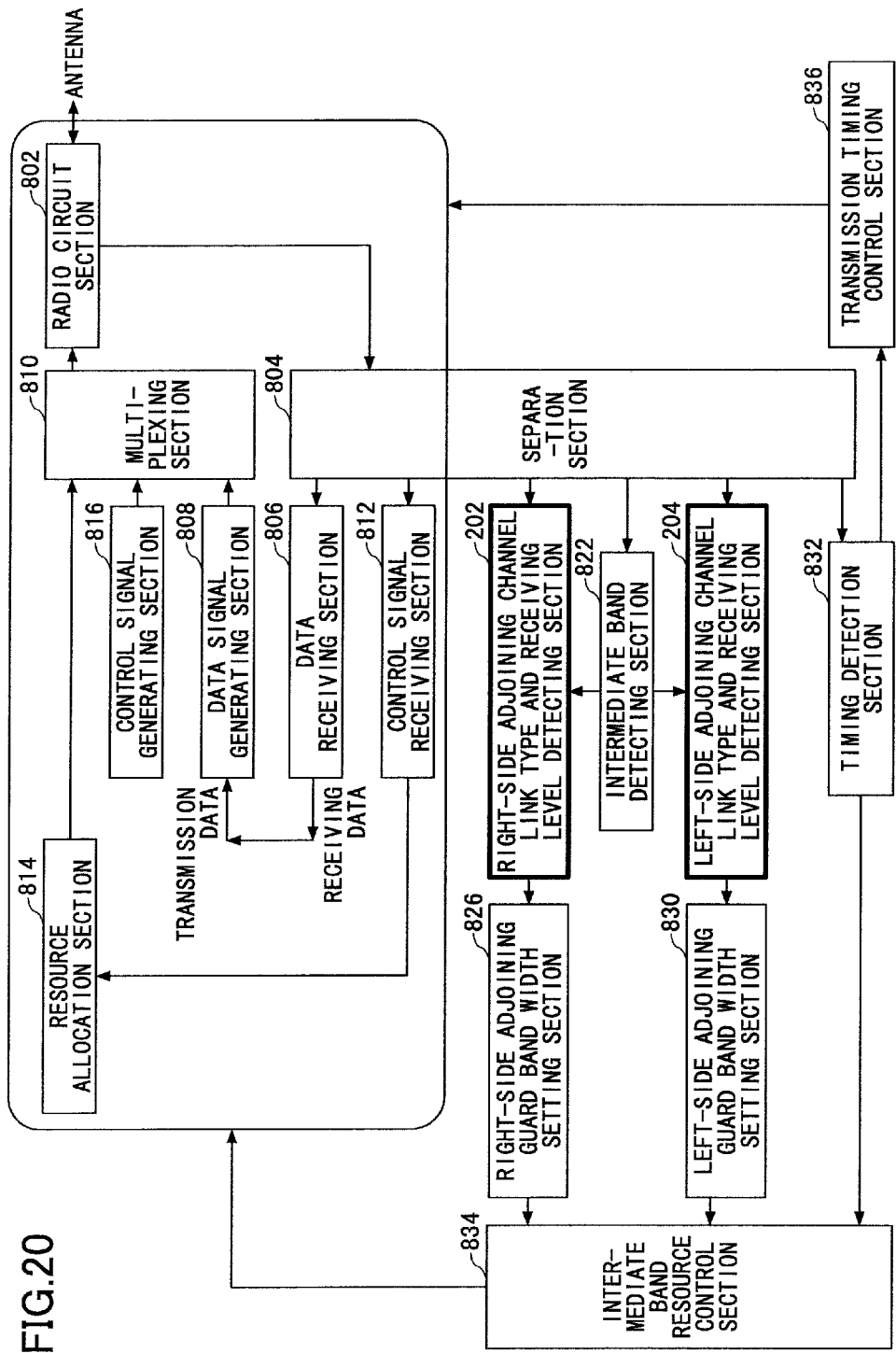
FIG. 20 is a drawing illustrating an exemplary configuration (considering inteference power) of a relay apparatus according to an embodiment of the present invention.

FIG. 20 shows a configuration of a relay apparatus according to an embodiment of the present invention. The configuration of FIG. 20 is basically the same as that of FIG. 8 except that a "right-side adjoining channel link type and receiving level detecting section 202" and a "left-side adjoining channel link type and receiving level detecting section 204" are provided in place of the "right-side channel link type detecting section 824" and the "left-side channel link type detecting section 828", respectively.

The right-side adjoining channel link type and receiving level detecting section 202 detects the link type (uplink or downlink) of the band adjacent to the intermediate band on the higher-frequency side, and measures the strength of the interference wave received from the band. Based on the measurement result, the right-side adjoining guard band width setting sections 826 determines the guard band width. When determined that the interference is strong, a wide guard band width is set. On the other hand, when determined that the interference is weak (small), a narrow guard band width is set.

The left-side adjoining channel link type and receiving level detecting section 204 detects the link type (uplink or downlink) of the band adjacent to the intermediate band on the lower-frequency side, and measures the strength of the interference wave received from the band. Based on the measurement result, the left-side adjoining guard band width setting sections 830 determines the guard band width. When determined that the interference is strong, a wide guard band width is set. On the other hand, when determined that the interference is weak (small), a narrow guard band width is set.

Figure 21:
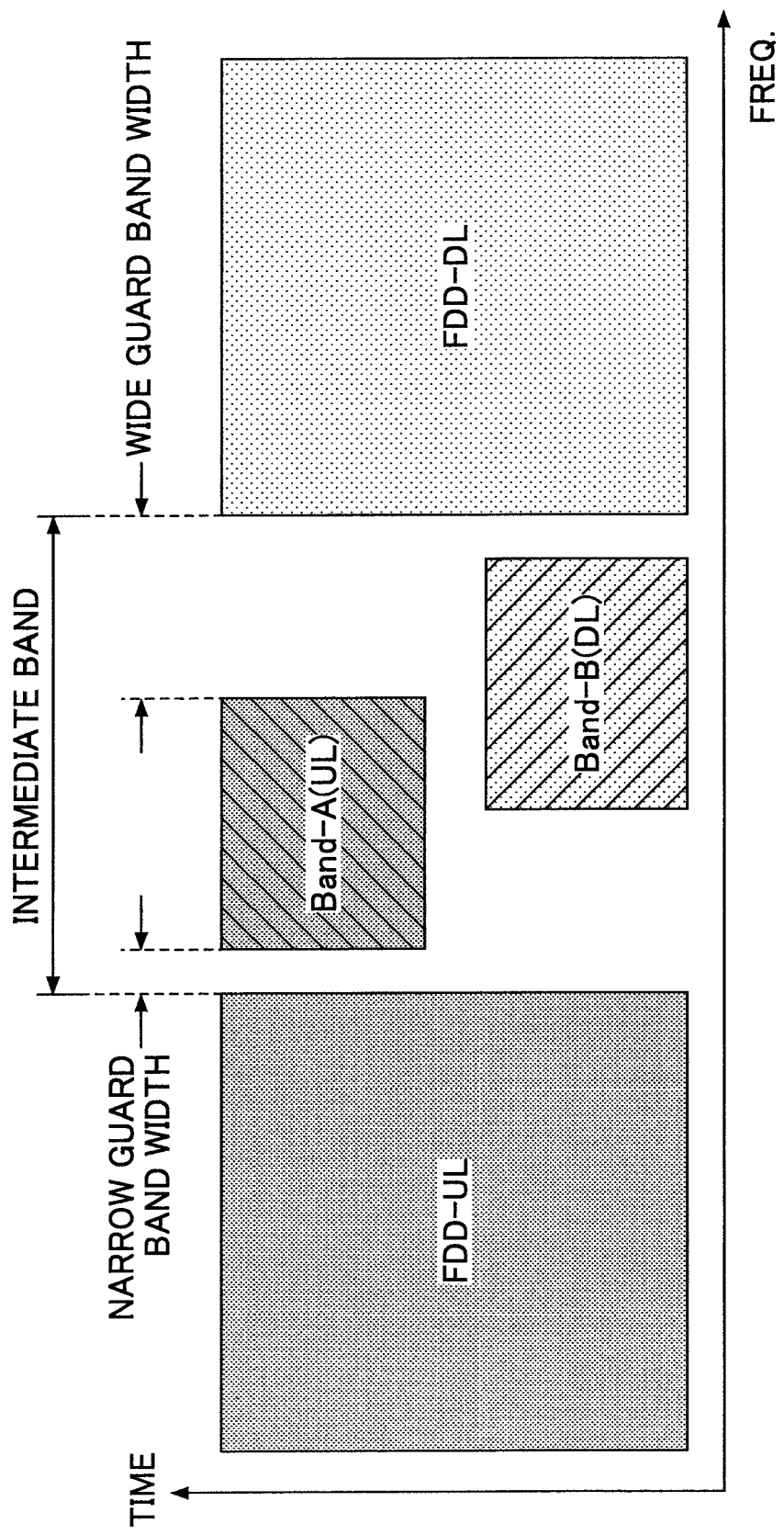
FIG. 21 is a drawing illustrating an example of using the interference band (when the inteference is high)

FIG. 21 illustrates a case where the strong interference occurs as illustrated in FIG. 18 and the bands adjacent to each other have the same transmission direction (i.e., uplink or downlink). In this case, relatively wide guard band is set. Further, as described above, when the transmission directions are opposite each other between the bands adjacent to each other, a wider guard band is required to be set.

Figure 22:
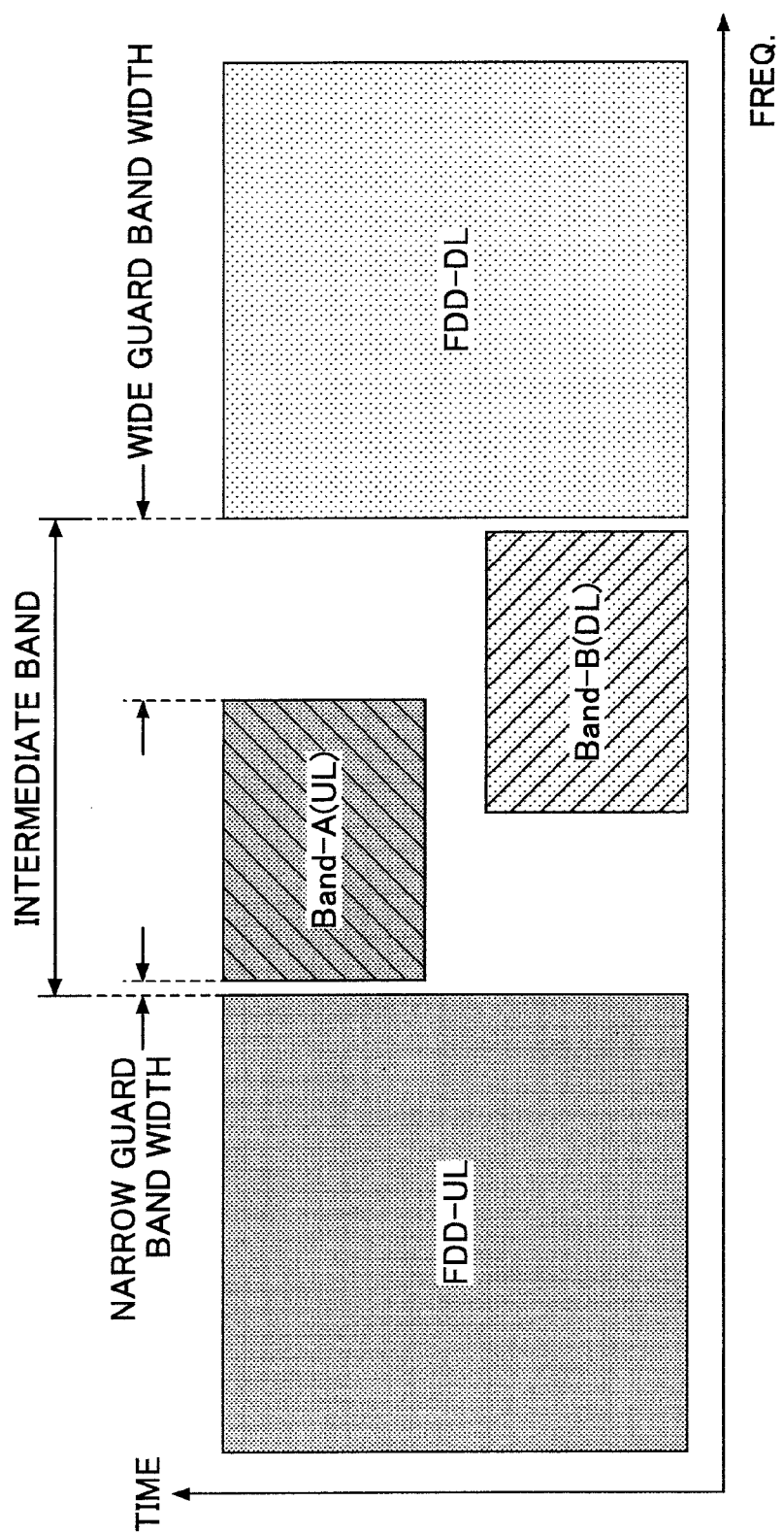
FIG. 22 is a drawing illustrating an example of using the interference band (when the inteference is low)

FIG. 22 illustrates a case where the weak (small) interference occurs as illustrated in FIG. 19 and the bands adjacent to each other have the same transmission direction (i.e., uplink or downlink). In this case, relatively narrow guard band is set. Further, as described above, when the transmission directions are opposite each other between the bands adjacent to each other, a wider guard band is required to be set.

In FDD-based system, it may be required to detect the both of the received signal levels of the pair of bands. This is because, for example, when a terminal receives a signal transmitted using the Band-B, the terminal does not normally use the Band-B to transmit a signal (the terminal normally uses Band-A which is the other band of the pair of the bands). In other words, this is because there may be a case where the terminal and the relay apparatus may be disposed close to each other even when the received signal level detected in Band-B is low. Further, the information item indicating which bands constitute the pair of the bands may be stored in advance as system information or may be broadcasted via a common pilot channel. Further, when the above information item is unknown, a search process may be performed on all the bands having the possibility of being one of the pair of the bands. In any case, it may be preferable that all the interference power actually perceived be accurately estimated as much as possible. Further, the relationships between the received power and the guard band width may be determined based on the relationship data stored in advance in the relay apparatus. Further, in addition to the guard band width, as described above, the maximum transmission power may also be determined based on the guard band width.

Fifth Embodiment

Use Control Signal

When the method is applied in which the CPC reports the guard band width and the allowed transmission power, the limitation of the transmission power may be uniformly applied in a geographically wide area. In this case, however, a concern may arise that the transmission power of the relay apparatus is inappropriately reduced. This is because a setting determined only in a limited area may also be applied to the rest of wide area by the CPC.

On the other hand, it is not always the case that a terminal receiving signals always performs transmission. Further, in general, when a terminal receiving signals performs transmission, the interval between the transmissions may not be constant. Such a transmission interval may largely vary depending on, for example, an applied method using the radio interface and a transmitted traffic amount. In the FDD-based system, it may be required to recognize the information indicating which bands constitute the pair of the bands (uplink and downlink). Further, a terminal receiving broadcast information may not transmit data for a long time period. As described above, the actual communication status is expected to vary. In response to the various cases, in addition to the setting of the guard band with and the transmission power control as described above, a use control signal may also be used.

Figure 23:
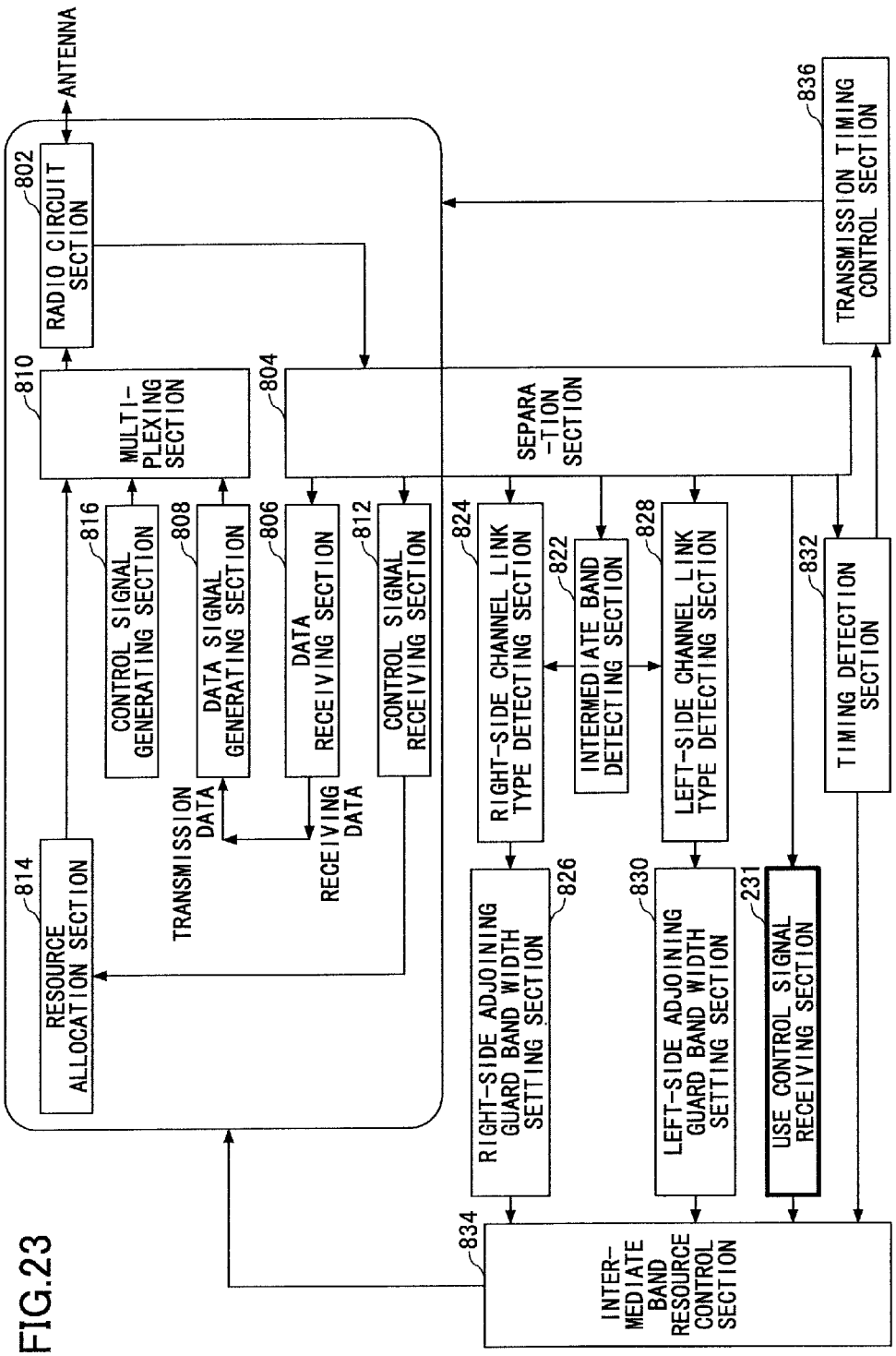
FIG. 23 is a drawing illustrating an exemplary configuration (example using a use control signal) of a relay apparatus according to an embodiment of the present invention.

FIG. 23 shows a configuration of a relay apparatus according to an embodiment of the present invention. The configuration of FIG. 23 is basically the same as that of FIG. 8 except that a "use control signal receiving section 231" is additionally provided. The use control signal receiving section 231 determines whether a use authorization/unauthorization signal which is the use control signal included in the received signal authorizes or prevents the use of any band. The determination result is reported to the intermediate band resource control section 834. When the prevention of the use of any band is detected, the use of the band designated by the signal is prevented.

Figure 24:
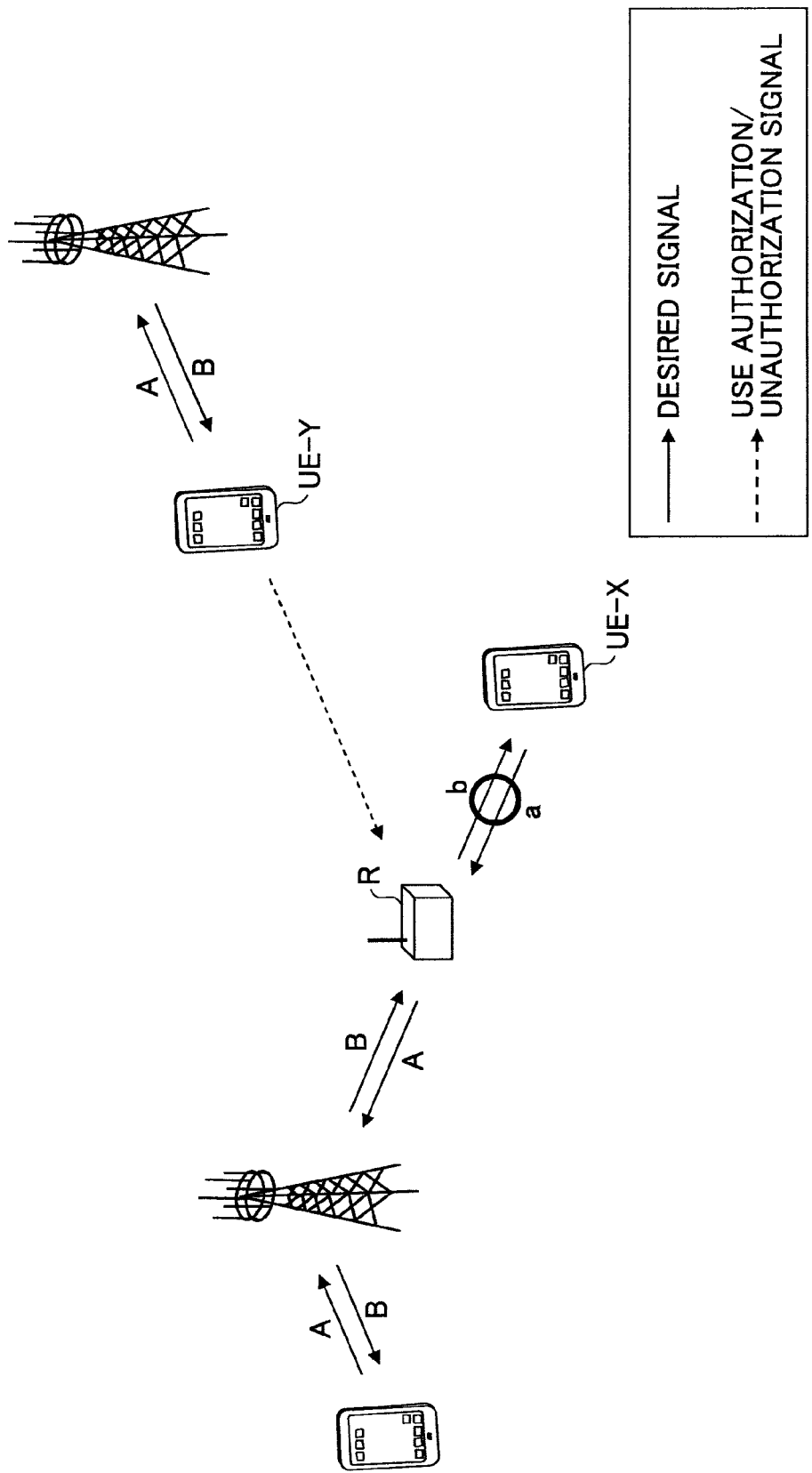
FIG. 24 is a drawing where a relay operation is authorized in the intermediate band.

FIG. 24 illustrates a case where the relay apparatus R does not receive strong interference from the terminal UE-Y when the relay apparatus R uses the intermediate band. In this case, the use control signal receiving section 231 does not detect any use authorization/unauthorization signal indicating the prevention of the use of the intermediate band. Accordingly, the use of the intermediate band is allowed (authorized). As a result, the relay apparatus R may perform communications with the terminal UE-X (i.e, a relay process of the relay apparatus is performed).

Figure 25:
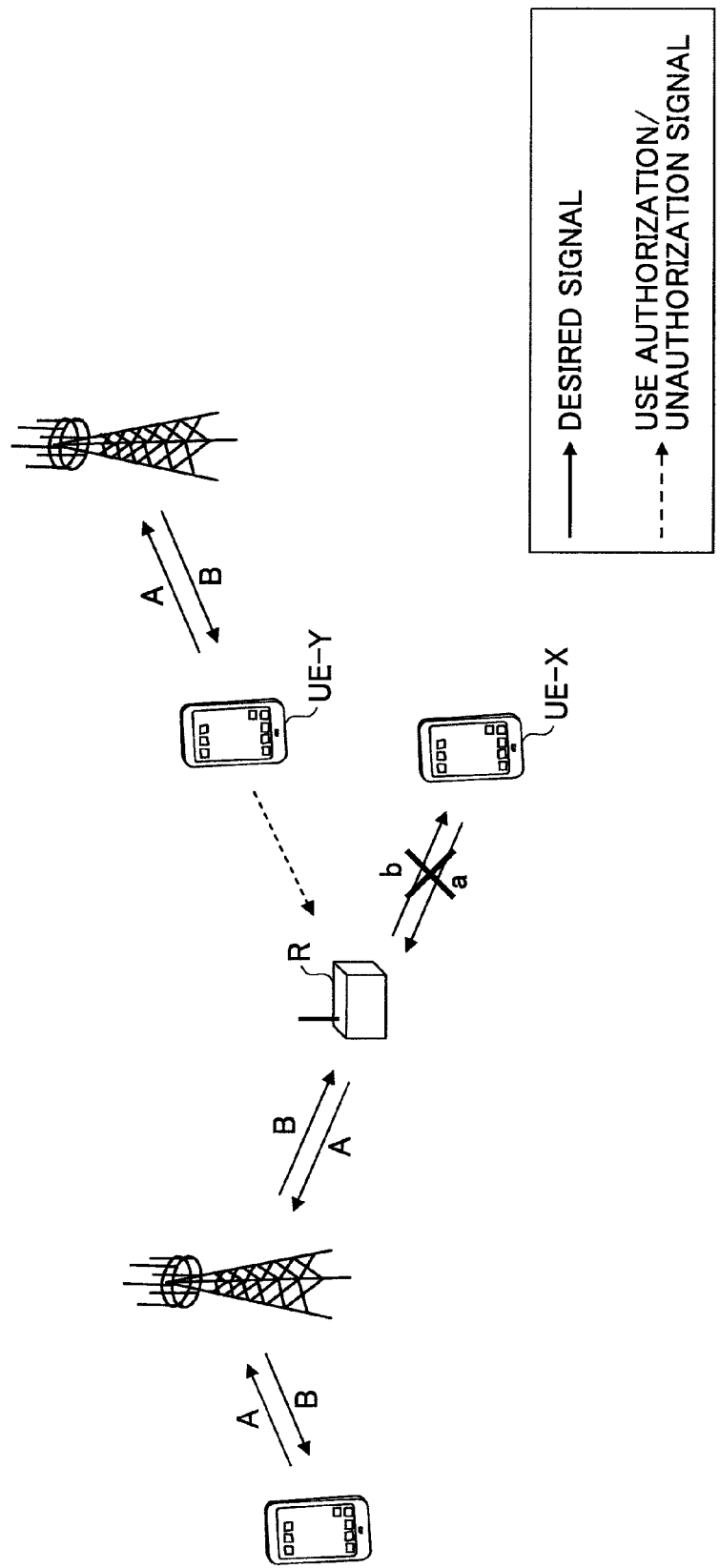
FIG. 25 is a drawing where a relay operation is prevented in the intermediate band.

FIG. 25 illustrates a case where the relay apparatus R receives strong interference from the terminal UE-Y when the relay apparatus R uses the intermediate band. In this case, the use authorization/unauthorization signal received by the use control signal receiving section 231 indicates that the use of the intermediate band is prevented. As a result, the relay apparatus R stops the communications with the terminal UE-X (i.e, the relay process of the relay apparatus is stopped). In this method, the CPC is not always necessary to be used. However, the CPC may be used.

Figure 26:
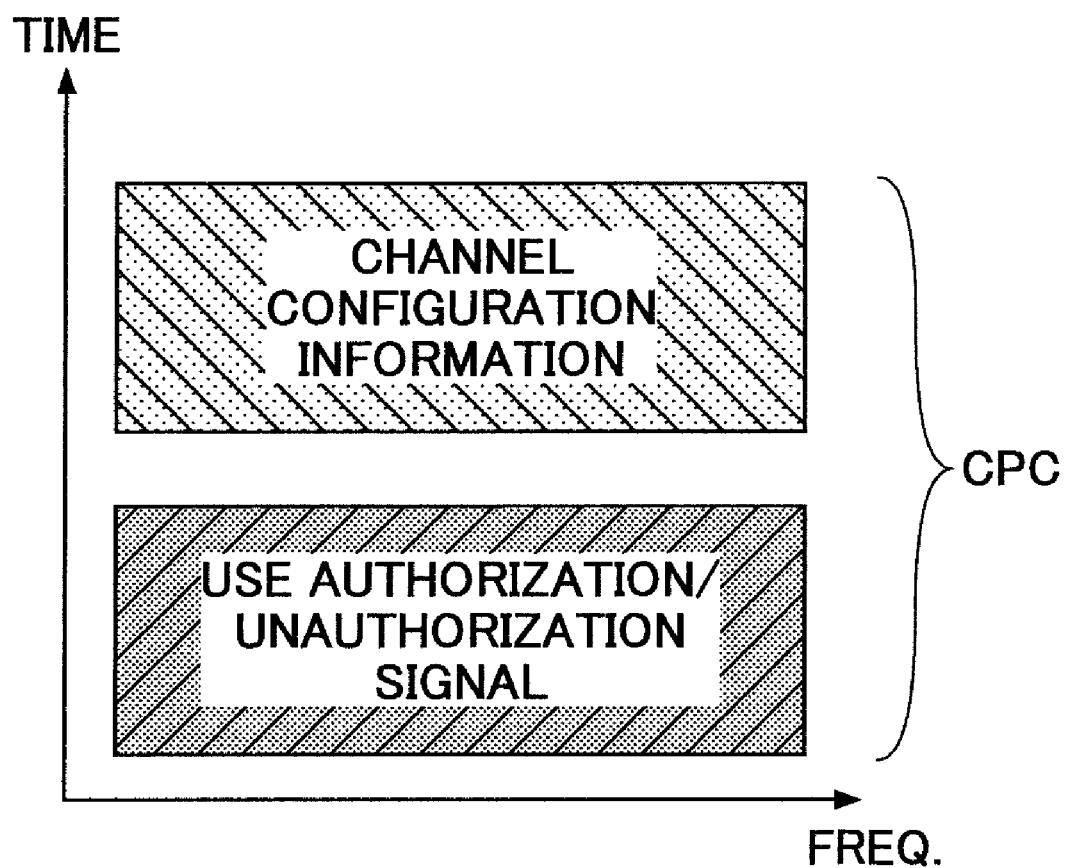
FIG. 26 is a drawing where a use authorization/unathorization signal is transmitted via the CPC.

As illustrate in FIG. 26, for example, in a part of the time period of the CPC, a channel for transmitting the use authorization/unauthorization signal may be allocated, and the terminals may transmit the use authorization/unauthorization signal using a part of the allocated resources for the CPC. In the example of FIG. 26, the term "use authorization/unauthorization signal" is described. In this case, however, the information only indicating that the use is prevented may be explicitly reported, or the information only indicating that the use is allowed may be explicitly reported. Otherwise, the information indicating either the use is allowed or the use is prevented may be explicitly reported. Further, the use authorization/unauthorization signal may be transmitted using the band other than the CPC, and the CPC may designate the information indicating the band transmitting the use authorization/unauthorization signal.

In any of the above embodiments, a case is described where one operator may use the intermediate band. However, plural operators may share the intermediate band. As a method of sharing the intermediate band, the "Listen-before-talk" method or any other appropriate method may be used. Further, in the above descriptions, a case is mainly described where the relay apparatus performs the relay operation. However, the present invention may also be applied to configure a self-operated radio application, more specifically to a local area network and a personal area network using radio signals. Further, the present invention may be applied to be used in both the relay application and the local/personal area network application. Further, in this case, a higher priority may be placed on the relay application.

In the above embodiments, a case is mainly described where one guard band is used. However, plural guard bands may be used to be applied to relay/self-operated radio communications. Further, to make it easier to establish the initial communication link, a signal corresponding to the ID (e.g., the purpose, operator ID, preamble) of the apparatus may be transmitted using a center frequency band of a specific guard band.

The present invention is described above by referring to a specific embodiment. However, a person skilled in the art may understand that the above embodiment is described for illustrative purpose only and may think of examples of various modifications, transformations, alterations, changes, and the like. To promote an understanding of the present invention, the specific values are used as examples throughout the description. However, it should be noted that such specific values are just sample values unless otherwise described, and any other values may be used. Further, it should be noted that the division of the embodiments and the items is not essential to the present invention. For example, two or more embodiments or items may be combined on an as-needed basis, and an item described in an embodiment or an item may be applied to another embodiment or item as long as it is not contradictory. For illustrative purposes, the apparatus according to an embodiment of the present invention is described with reference to the functional block diagram. However, such an apparatus may be provided by hardware, software, or a combination thereof. The present invention is not limited to the embodiment described above, and various modifications, transformations, alteration, exchanges, and the like may be made without departing from the scope and spirit from the present invention.

The present international application claims priority from Japanese Patent Application No. 2008-057026 filed on Mar. 6, 2008, the entire contents of which are hereby incorporated herein by reference.

The invention claimed is:

1. A radio communication apparatus comprising:
    an intermediate band detecting unit configured to detect an intermediate band which is a band between a first frequency band and a second frequency band which are allocated to a same mobile communication system or different mobile communication systems;
    a use status detecting unit configured to detect an uplink/downlink multiplexing method used in each of the first frequency band and the second frequency band; and
    a determination unit configured to determine, based on the intermediate band and the uplink/downlink multiplexing method, the uplink/downlink multiplexing method usable in the intermediate band and a guard band in which use of frequencies are prevented, the guard band being included in the intermediate band.

2. The radio communication apparatus according to claim 1, wherein
    the intermediate band includes one pair of bands and the guard band, the one pair of bands including an uplink band and a downlink band.

3. The radio communication apparatus according to claim 2, wherein
    a width of the guard band varies depending on whether a transmission direction of a band adjacent to the guard band on a higher-frequency side is a same as the transmission direction of a band adjacent to the guard band on a lower-frequency side.

4. The radio communication apparatus according to claim 3, wherein
    the width of the guard band or a transmission power of at least one of the band adjacent to the guard band on the higher-frequency side and the band adjacent to the guard band on the higher-frequency side varies depending on an interference signal level received from a mobile communication system different from a mobile communication system to which the radio communication apparatus belongs.

5. The radio communication apparatus according to claim 2, wherein
    depending on whether a transmission direction of a band adjacent to the guard band on a higher-frequency side is a same as the transmission direction of a band adjacent to the guard band on a lower-frequency side, a transmission power varies at least one of the higher-frequency side and the lower-frequency side of the intermediate band.

6. The radio communication apparatus according to claim 1, wherein
    a Time Division Duplexing (TDD) scheme is used in both a band adjacent to the guard band on a higher-frequency side and a band adjacent to the guard band on a lower-frequency side, and
    an uplink/downlink ratio of radio resources is a same between the bands.

7. The radio communication apparatus according to claim 1, wherein
    a Time Division Duplexing (TDD) scheme is used in both a band adjacent to the guard band on a higher-frequency side and a band adjacent to the guard band on a lower-frequency side, and
    a frame length or an uplink/downlink ratio of radio resources is different between the bands.

8. The radio communication apparatus according to claim 7, wherein
    a width of the guard band varies depending on whether a transmission direction of the band adjacent to the guard band on the higher-frequency side is a same as the transmission direction of the band adjacent to the guard band on the lower-frequency side.

9. The radio communication apparatus according to claim 1, further comprising:
    a receiving section configured to receive a control signal indicating at least one of frequency information of the intermediate band, a transmission power allowed in the intermediate band, and the guard band.

10. A method used in a radio communication apparatus, the method comprising:
    an intermediate band detecting step of detecting an intermediate band which is a band between a first frequency band and a second frequency band which are allocated to a same mobile communication system or different mobile communication systems;

a use status detecting step of detecting an uplink/downlink multiplexing method used in each of the first frequency band and the second frequency band; and a determination step of determining, based on the intermediate band and the uplink/downlink multiplexing method, the uplink/downlink multiplexing method usable in the intermediate band and a guard band in which use of frequencies are prevented, the guard band being included in the intermediate band.

* * * * *